US009272629B2

(12) United States Patent
Li et al.

(10) Patent No.: US 9,272,629 B2
(45) Date of Patent: Mar. 1, 2016

(54) POWER SYSTEM SWITCHING BETWEEN CHARGE-DISCHARGE FUNCTION AND DRIVING FUNCTION AND ELECTRIC VEHICLE COMPRISING THE SAME

(71) Applicants: Shenzhen BYD Auto R&D Company Limited, Shenzhen, Guangdong (CN); BYD Company Limited, Shenzhen (CN)

(72) Inventors: Yingtao Li, Shenzhen (CN); Xinxin Zhang, Shenzhen (CN); Fu Tang, Shenzhen (CN)

(73) Assignees: Shenzhen BYD Auto R&D Company Limited (CN); BYD Company Limited (CN)

( * ) Notice: Subject to any disclaimer, the term of this patent is extended or adjusted under 35 U.S.C. 154(b) by 7 days.

(21) Appl. No.: 14/369,924

(22) PCT Filed: Dec. 31, 2012

(86) PCT No.: PCT/CN2012/088058
§ 371 (c)(1),
(2) Date: Jun. 30, 2014

(87) PCT Pub. No.: WO2013/097815
PCT Pub. Date: Jul. 4, 2013

(65) Prior Publication Data
US 2014/0354195 A1 Dec. 4, 2014

(30) Foreign Application Priority Data

Dec. 31, 2011 (CN) .......................... 2011 1 0458395
Dec. 31, 2011 (CN) .......................... 2011 2 0571932
Jun. 7, 2012 (CN) .......................... 2012 1 0185660
Jun. 7, 2012 (CN) .......................... 2012 2 0266009
Jun. 27, 2012 (CN) .......................... 2012 1 0214502
Jun. 27, 2012 (CN) .......................... 2012 2 0303636

(51) Int. Cl.
*H02P 1/00* (2006.01)
*B60L 11/18* (2006.01)
(Continued)

(52) U.S. Cl.
CPC ............. *B60L 11/1811* (2013.01); *B60L 11/18* (2013.01); *B60L 11/1803* (2013.01);
(Continued)

(58) Field of Classification Search
CPC ............................... B60L 11/1809; H02J 7/02
USPC .......... 318/139, 400.01, 400.14, 400.15, 700, 318/701, 727, 800, 801, 432, 437, 599, 318/811; 320/109, 128, 134, 138, 140, 160, 320/166; 388/800, 819, 811
See application file for complete search history.

(56) References Cited

U.S. PATENT DOCUMENTS 8,242,627 B2 * 8/2012 Ichikawa ..................... 307/10.1
8,274,262 B2 9/2012 Harada
(Continued)

FOREIGN PATENT DOCUMENTS

CN 201594757 U 9/2010
CN 201781330 U 3/2011
(Continued)

OTHER PUBLICATIONS

International Search Report for Application No. PCT/CN2012/088041 dated Apr. 4, 2013.
(Continued)

*Primary Examiner* — Antony M Paul
(74) *Attorney, Agent, or Firm* — Lerner, David, Littenberg, Krumholz & Mentlik, LLP

(57) ABSTRACT

A power system switching between a charge-discharge function and a driving function and an electric vehicle including the same are provided. The power system includes a power battery; a charge-discharge socket; a bidirectional DC/DC module; a driving control switch connected with the power battery and the bidirectional DC/DC module; a bidirectional DC/AC module connected with the driving control switch and the power battery; a motor control switch connected with the bidirectional DC/AC module and a motor; a charge-discharge control module connected with the bidirectional DC/AC module and the charge-discharge socket; and a controller module configured to establish a path between the power battery and the motor when a current operation mode of the power system is a driving mode, and to establish a path between the charge-discharge socket and the power battery when the current operation mode of the power system is a charge-discharge mode.

20 Claims, 13 Drawing Sheets

(51) Int. Cl.
*H02J 7/00* (2006.01)
*H02J 7/02* (2006.01)
*H04B 3/54* (2006.01)

(52) U.S. Cl.
CPC ........ *B60L 11/1805* (2013.01); *B60L 11/1809* (2013.01); *B60L 11/1814* (2013.01); *B60L 11/1816* (2013.01); *B60L 11/1838* (2013.01); *B60L 11/1842* (2013.01); *B60L 11/1861* (2013.01); *H02J 7/007* (2013.01); *H02J 7/0036* (2013.01); *H02J 7/0054* (2013.01); *H02J 7/0065* (2013.01); *H02J 7/02* (2013.01); *H04B 3/542* (2013.01); *B60L 2210/42* (2013.01); *H02J 2007/0067* (2013.01); *Y02E 60/721* (2013.01); *Y02T 10/705* (2013.01); *Y02T 10/7005* (2013.01); *Y02T 10/7044* (2013.01); *Y02T 10/7241* (2013.01); *Y02T 90/121* (2013.01); *Y02T 90/127* (2013.01); *Y02T 90/128* (2013.01); *Y02T 90/14* (2013.01); *Y02T 90/16* (2013.01); *Y02T 90/163* (2013.01); *Y04S 10/126* (2013.01)

(56) References Cited

U.S. PATENT DOCUMENTS

| | | | |
|---|---|---|---|
| 8,421,271 B2 * | 4/2013 | King et al. | 307/82 |
| 8,478,469 B2 | 7/2013 | Ueo et al. | |
| 8,810,060 B2 | 8/2014 | Kamaga | |
| 2007/0075661 A1 | 4/2007 | Hsu | |
| 2011/0050174 A1 * | 3/2011 | King et al. | 320/134 |
| 2011/0101915 A1 * | 5/2011 | Mitsutani | 320/109 |
| 2012/0049771 A1 | 3/2012 | Komatsu | |
| 2012/0123625 A1 * | 5/2012 | Ueo et al. | 701/22 |
| 2012/0153717 A1 | 6/2012 | Obayashi et al. | |

FOREIGN PATENT DOCUMENTS

| | | |
|---|---|---|
| CN | 102045086 A | 5/2011 |
| CN | 102055226 A | 5/2011 |
| CN | 201839022 U | 5/2011 |
| CN | 102118184 A | 7/2011 |
| CN | 102195504 A | 9/2011 |
| CN | 202276163 U | 6/2012 |
| CN | 202435108 U | 9/2012 |
| CN | 202455130 U | 9/2012 |
| CN | 102882249 A | 1/2013 |
| CN | 102904300 A | 1/2013 |
| CN | 102916464 A | 2/2013 |
| JP | 2009077557 A | 4/2009 |
| JP | 2009290920 A | 12/2009 |
| JP | 2010178431 A | 8/2010 |
| WO | 2011013388 A2 | 2/2011 |

OTHER PUBLICATIONS

International Search Report for Application No. PCT/CN2012/088058 dated Apr. 11, 2013.
International Search Report for Application No. PCT/CN2012/088061 dated Apr. 4, 2013.
International Search Report for Application No. PCT/CN2012/088069 dated Apr. 18, 2013.
International Search Report for Application No. PCT/CN2012/088094 dated Apr. 18, 2013.

* cited by examiner

POWER SYSTEM SWITCHING BETWEEN CHARGE-DISCHARGE FUNCTION AND DRIVING FUNCTION AND ELECTRIC VEHICLE COMPRISING THE SAME

CROSS-REFERENCE TO RELATED APPLICATIONS

The present application is a national phase entry under 35 U.S.C. §371 of International Application No. PCT/CN2012/088058, filed Dec. 31, 2012, which claims priority to Chinese Application Nos. 201220303636.X, filed Jun. 27, 2012; 201210214502.5, filed Jun. 27, 2012; 201210185660.2, filed Jun. 7, 2012; 201220266009.3, filed Jun. 7, 2012; 201110458395.6 filed Dec. 31, 2011; 201120571932.3, filed Dec. 31, 2011, all of which are hereby incorporated herein by reference.

FIELD

The present disclosure relates to an electric vehicle field, and more particularly to a power system switching between a charge-discharge function and a driving function, and an electric vehicle comprising the power system.

BACKGROUND

With the development of science and technology, fuel vehicles are being replaced by environment friendly and energy saving electric vehicles. However, the popularity of the electric vehicles encounters some problems, among which high driving mileage and fast charging technology has become a major problem in the promotion of electric vehicles.

Currently, large-capacity batteries are used in most electric vehicles. However, although these batteries may enhance a battery life of the electric vehicle, they make a charging time too long. Although a specialized DC (direct current) charging station may charge a battery quickly, problems such as high cost and large occupied area make the popularity of such an infrastructure encounter a certain difficulty. Moreover, because of a limited space of the vehicle, an in-vehicle charger may not satisfy the requirement of a charging power due to the limitation of its volume.

A charging solution currently used in the market comprises the following solutions.

Solution (1)

As shown in FIGS. 1-2, an in-vehicle charge-discharge device in this solution mainly comprises a three-phase power transformer 1', a three-phase bridge circuit 2' consisting of six thyristor elements, a constant-voltage control device AUR, and a constant-current control device ACR. However, this solution causes a serious waste of space and cost.

Solution (2)

As shown in FIG. 3, an in-vehicle charge-discharge device in this solution comprises two charge sockets 15', 16' to adapt to the single-phase/three-phase charging, which increases the cost. A motor driving loop comprises a filtering module consisting of an inductor L1' and a capacitor C1'. When a motor is driven, a loss of a three-phase current is generated when it flows through the filtering module, which causes a waste of an electric quantity of a battery. With this solution, during the charge-discharge operation, an inverter 13' rectifies/inverts an AC (alternating current), and the voltage after the rectifying/inverting may not be adjusted, such that a battery operation voltage range is narrow.

Therefore, most AC charging technologies currently used in the market are a single-phase charging technology, which has disadvantages of low charging power, long charging time, large hardware volume, single function, restriction by voltage levels of different regional grids, etc.

SUMMARY

Embodiments of the present disclosure seek to solve at least one of the problems existing in the related art to at least some extent.

Accordingly, an object of the present disclosure is to provide a power system switching between a charge-discharge function and a driving function, which may charge the electric vehicle with a high power by means of a civil or industrial AC grid, such that a user may perform the charge efficiently, promptly, anytime and anywhere. Moreover, a constant-voltage control device or a constant-current control device is not required, thus saving a space and a cost and having a wide battery operation voltage range.

Another object of the present disclosure is to provide an electric vehicle.

In order to achieve the above objects, embodiments of an aspect of the present disclosure provide a power system switching between a charge-discharge function and a driving function. The power system includes: a power battery; a charge-discharge socket; a bidirectional DC/DC module having a first DC terminal connected with a first terminal of the power battery and a second DC terminal connected with a second terminal of the power battery, in which the first DC terminal is a common DC terminal for an input to and an output from the bidirectional DC/DC module; a driving control switch having a first terminal connected with the second terminal of the power battery and a second terminal connected with a third DC terminal of the bidirectional DC/DC module; a bidirectional DC/AC module having a first DC terminal connected with the second terminal of the driving control switch and a second DC terminal connected with the first terminal of the power battery; a motor control switch having a first terminal connected with an AC terminal of the bidirectional DC/AC module and a second terminal connected with a motor; a charge-discharge control module having a first terminal connected with the AC terminal of the bidirectional DC/AC module and a second terminal connected with the charge-discharge socket; and a controller module connected with the driving control switch, the motor control switch and the charge-discharge control module respectively, and configured to establish a path between the power battery and the motor when a current operation mode of the power system is a driving mode, and to establish a path between the charge-discharge socket and the power battery when the current operation mode of the power system is a charge-discharge mode.

With the power system switching between the charge-discharge function and the driving function according to embodiments of the present disclosure, the electric vehicle can be charged with a high power by means of a civil or industrial AC grid, such that a user may perform the charge efficiently, promptly, anytime and anywhere, thus saving a charging time. Moreover, a constant-voltage control device or a constant-current control device is not required, thus saving a space and a cost and having a wide battery operation voltage range.

Moreover, embodiments of another aspect of the present disclosure provide an electric vehicle including the above-mentioned power system.

The electric vehicle can be charged with a high power by means of a three-phase or single-phase current, such that a user may charge the electric vehicle conveniently, promptly, anytime and anywhere, thus saving a time cost and satisfying the requirement of persons.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
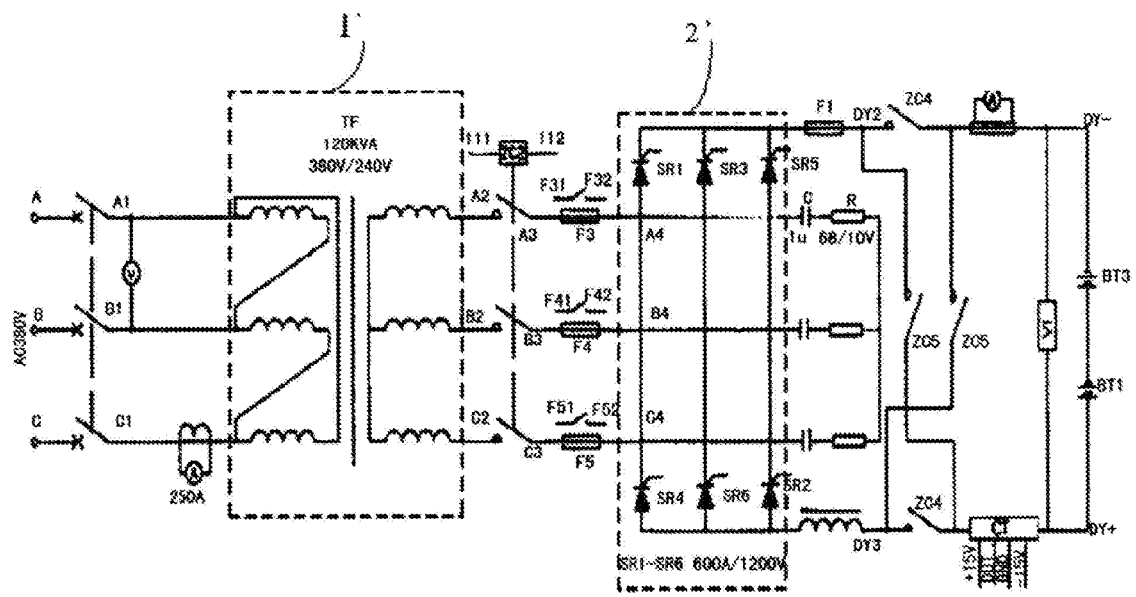
FIG. 1 is a circuit diagram of a conventional in-vehicle charge-discharge device.
Figure 2:
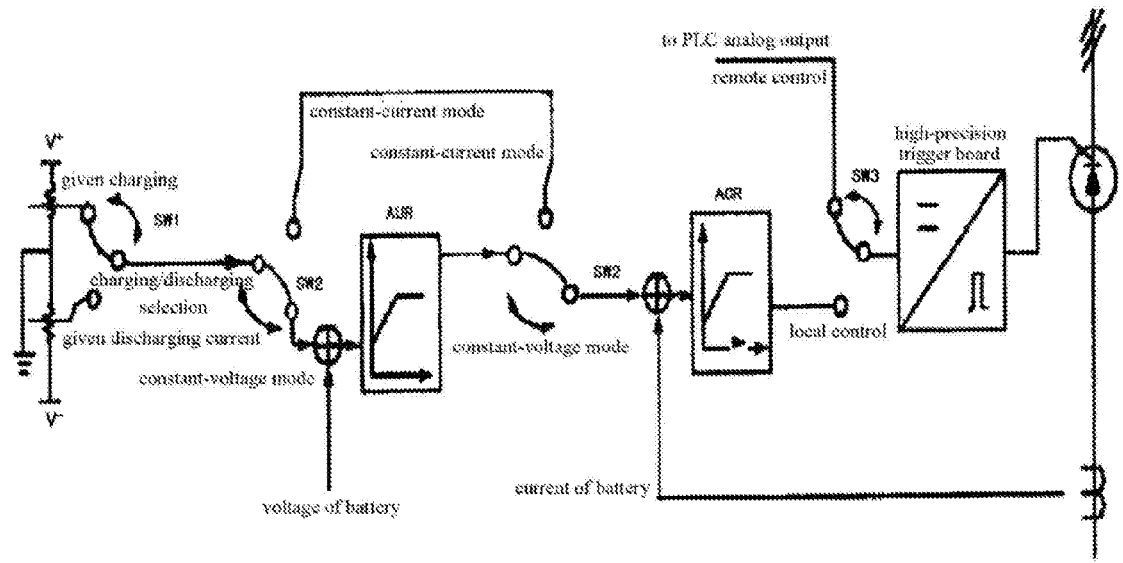
FIG. 2 is a diagram of controlling a conventional in-vehicle charge-discharge device.
Figure 3:
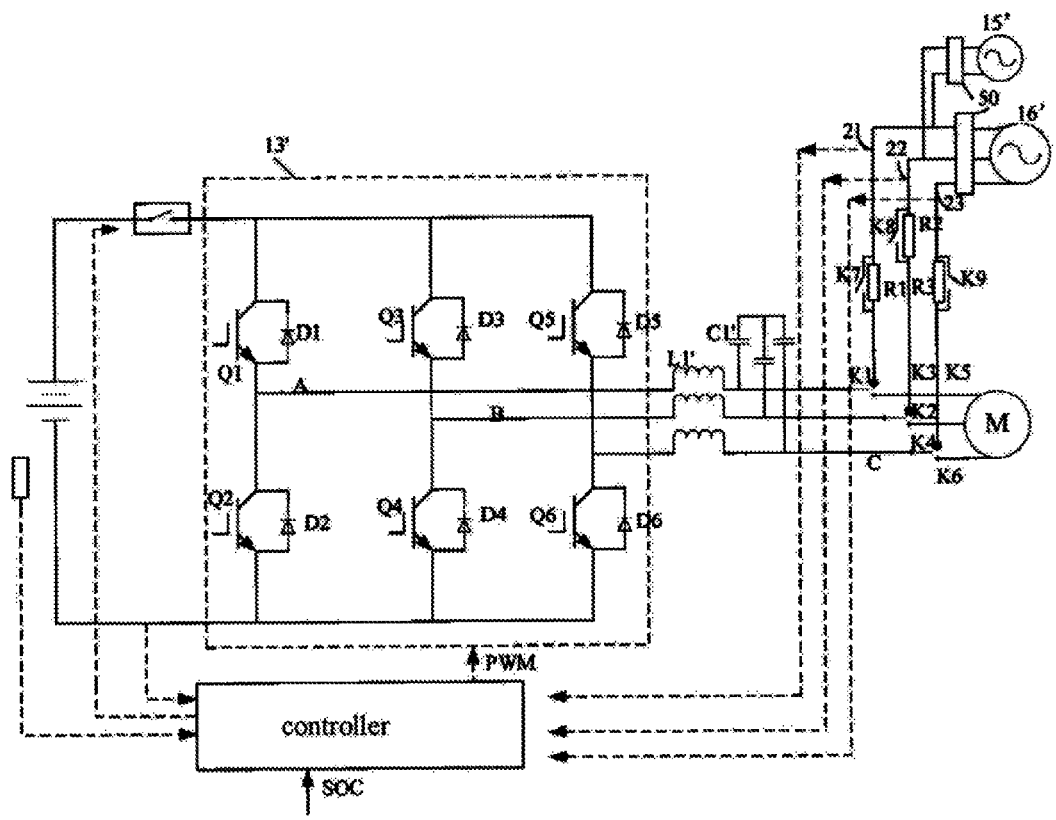
FIG. 3 is a circuit diagram of another conventional in-vehicle charge-discharge device.

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

Various embodiments and examples are provided in the following description to implement different structures of the present disclosure. In order to simplify the present disclosure, certain elements and settings will be described. However, these elements and settings are only by way of example and are not intended to limit the present disclosure. In addition, reference numerals may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied. Moreover, a structure in which a first feature is "on" a second feature may include an embodiment in which the first feature directly contacts the second feature, and may also include an embodiment in which an additional feature is formed between the first feature and the second feature so that the first feature does not directly contact the second feature.

In the description of the present disclosure, it should be understood that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the particular embodiment of the present disclosure.

Referring to the following descriptions and drawings, these and other aspects of the embodiments of the present disclosure will be apparent. In these descriptions and drawings, some specific approaches of the embodiments of the present disclosure are provided, so as to show some ways to perform the principle of the embodiments of the present disclosure, however it should be understood that the embodiment of the present disclosure is not limited thereby. Instead, the embodiments of the present disclosure comprise all the variants, modifications and their equivalents within the spirit and scope of the present disclosure as defined by the claims.

A power system switching between a charge-discharge function and a driving function and an electric vehicle including the power system according to embodiments of the present disclosure will be described below with reference to the drawings.

Figure 4:
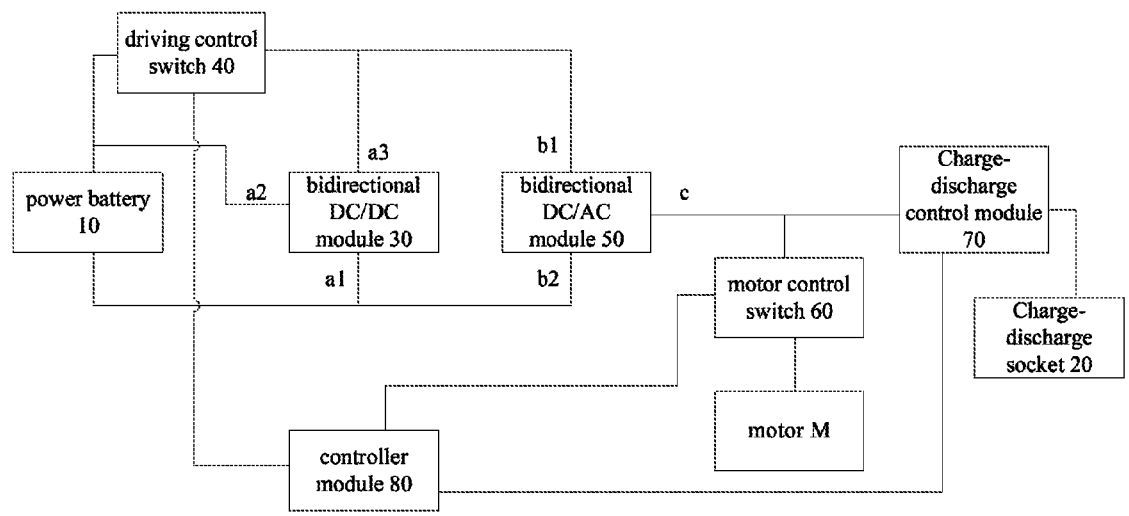
FIG. 4 is a block diagram of a power system switching between a charge-discharge function and a driving function according to an embodiment of the present disclosure.

As shown in FIG. 4, a power system switching between a charge-discharge function and a driving function according to an embodiment of the present disclosure includes a power battery 10, a charge-discharge socket 20, a bidirectional DC/DC module 30, a driving control switch 40, a bidirectional DC/AC module 50, a motor control switch 60, a charge-discharge control module 70 and a controller module 80.

The bidirectional DC/DC module 30 has a first DC terminal a1 connected with a first terminal of the power battery 10 and a second DC terminal a2 connected with a second terminal of the power battery 10. The first DC terminal a1 is a common DC terminal for an input to and an output from the bidirectional DC/DC module 30. The driving control switch 40 has a first terminal connected with the second terminal of the power battery 10 and a second terminal connected with a third DC terminal a3 of the bidirectional DC/DC module 30. The bidirectional DC/AC module 50 has a first DC terminal b1 connected with the second terminal of the driving control switch 40 and a second DC terminal b2 connected with the first terminal of the power battery 10. The motor control switch 60 has a first terminal connected with an AC terminal c of the bidirectional DC/AC module 50 and a second terminal connected with a motor M. The charge-discharge control module 70 has a first terminal connected with the AC terminal c of the bidirectional DC/AC module 50 and a second terminal connected with the charge-discharge socket 20. The controller module 80 is connected with the driving control switch 40, the motor control switch 60 and the charge-discharge control module 70 respectively, and configured to establish a path between the power battery 10 and the motor M when a current operation mode of the power system is a driving mode, and to establish a path between the charge-discharge socket 20 and the power battery 10 when the current operation mode of the power system is a charge-discharge mode.

Further, in some embodiments, the current operation mode of the power system may include a driving mode and a charge-discharge mode. When the current operation mode of the power system is the driving mode, the controller module 80 controls the driving control switch 40 to turn on to stop the bidirectional DC/DC module 30, controls the motor control switch 60 to turn on to drive the motor M normally, and controls the charge-discharge control module 70 to turn off. It should be noted that, although in some embodiments, the motor control switch 60 in FIG. 5 includes three switches connected with a three-phase input to the motor, in other embodiments, the motor control switch 60 may also include two switches connected with a two-phase input to the motor, or even one switch, as long as the control on the motor may be realized. Therefore, other embodiments will not be described in detail herein.

When the current operation mode of the power system is the charge-discharge mode, the controller module 80 controls the driving control switch 40 to turn off to start the bidirectional DC/DC module 30, controls the motor control switch 60 to turn off to remove the motor M, and controls the charge-discharge control module 70 to turn on, such that an external power source may charge the power battery 10 normally. The first DC terminal a1 and the third DC terminal a3 of the bidirectional DC/DC module 30 are connected with a positive terminal and a negative terminal of a DC bus respectively.

Figure 5:
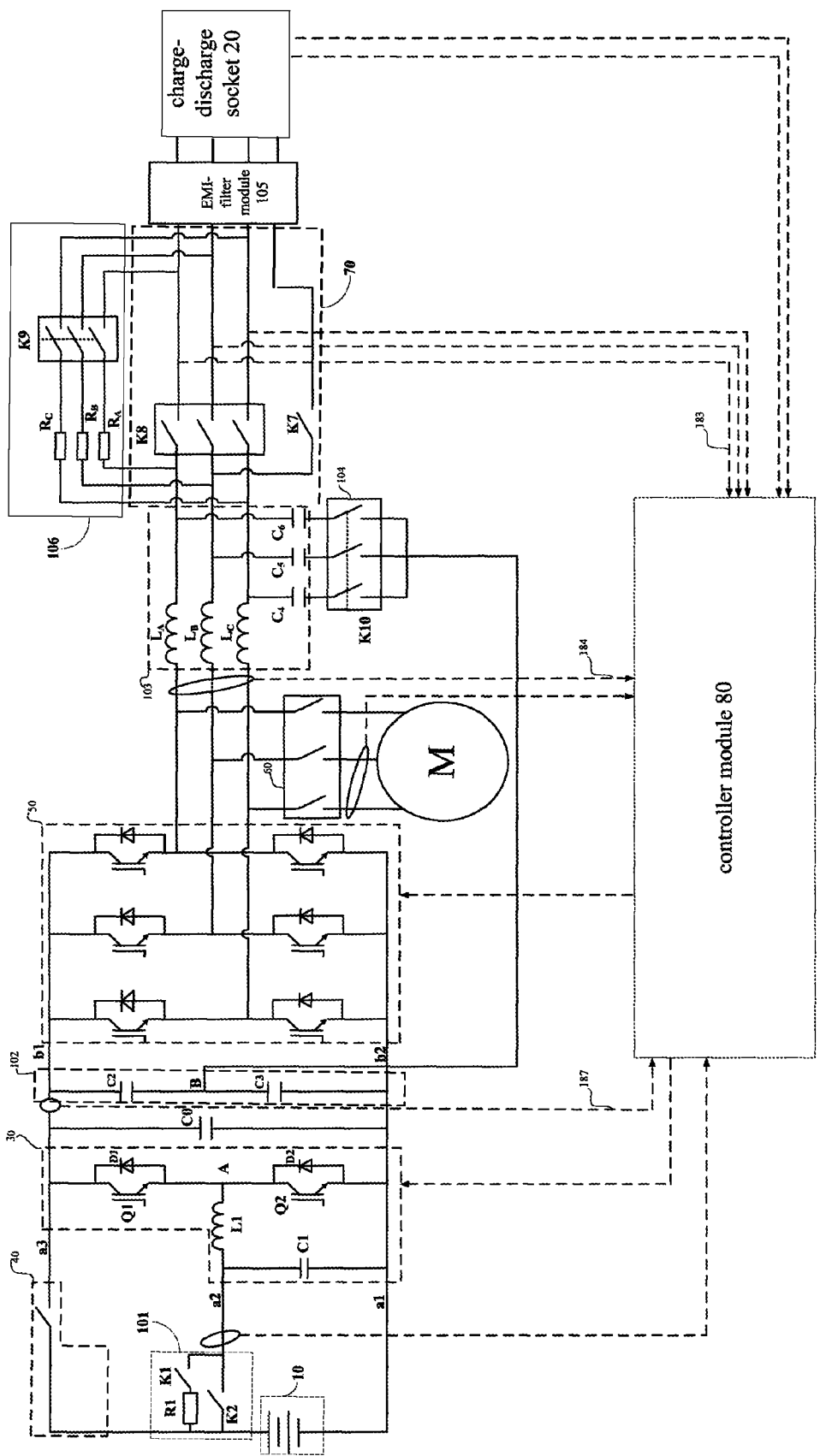
FIG. 5 is a topological diagram of a power system switching between a charge-discharge function and a driving function according to an embodiment of the present disclosure.

In one embodiment, as shown in FIG. 5, the power system switching between the charge-discharge function and the driving function further includes a first pre-charging control module 101. The first pre-charging control module 101 has a first terminal connected with the second terminal of the power battery 10 and a second terminal connected with the second DC terminal a2 of the bidirectional DC/DC module 30, and configured to pre-charge a capacitor C1 in the bidirectional DC/DC module 30 and a bus capacitor C0 connected between the first DC terminal a1 and the third DC terminal a3 of the bidirectional DC/DC module 30. The first pre-charging control module 101 includes a first switch K1, a first resistor R1 and a second switch K2. The first switch K1 has a first terminal connected with the second DC terminal a2 of the bidirectional DC/DC module 30. The first resistor R1 has a first terminal connected with a second terminal of the first switch K1 and a second terminal connected with the second terminal of the power battery 10. The second switch K2 is connected in parallel with the first resistor R1 and the first switch K1 which are connected in series. When the power system starts, the controller module 80 controls the first switch K1 to turn on to pre-charge the capacitor C1 in the bidirectional DC/DC module 30 and the bus capacitor C0; and when a voltage across the bus capacitor C0 is a predetermined multiple of a voltage of the power battery 10, the controller module 80 controls the first switch K1 to turn off and controls the second switch K2 to turn on.

As shown in FIG. 5, the bidirectional DC/DC module 30 includes a first switching transistor Q1, a second switching transistor Q2, a first diode D1, a second diode D2, a first inductor L1 and a first capacitor C1. The first switching transistor Q1 and the second switching transistor Q2 are connected in series, and connected between the first DC terminal a1 and the third DC terminal a3 of the bidirectional DC/DC module 30, and controlled by the controller module 80. A first node A is defined between the first switching transistor Q1 and the second switching transistor Q2. The first diode D1 is connected with the first switching transistor Q1 in inverse-parallel. The second diode D2 is connected with the second switching transistor Q2 in inverse-parallel. The first inductor L1 has a first terminal connected with the first node A and a second terminal connected with the second terminal of the power battery 10. The first capacitor C1 has a first terminal connected with the second terminal of the first inductor L1 and a second terminal connected with the first terminal of the power battery 10.

Moreover, in some embodiments, as shown in FIG. 5, the power system switching between the charge-discharge function and the driving function further includes a leakage current reducing module 102. The leakage current reducing module 102 is connected between the first DC terminal a1 and the third DC terminal a3 of the bidirectional DC/DC module 30. Specifically, the leakage current reducing module 102 includes a second capacitor C2 and a third capacitor C3. The second capacitor C2 has a first terminal connected with a first terminal of the third capacitor C3 and a second terminal connected with the third DC terminal a3 of the bidirectional DC/DC module 30, the third capacitor C3 has a second terminal connected with the first DC terminal a1 of the bidirectional DC/DC module 30, and a second node B is defined between the second capacitor C2 and the third capacitor C3.

Generally, a leakage current is large in an inverter and grid system without transformer isolation. Therefore, with the power system according to embodiments of the present disclosure, the leakage current reducing module 102 is connected between the positive terminal and the negative terminal of the DC bus, thus reducing the leakage current effectively. The leakage current reducing module 102 includes two capacitors C2 and C3 of the same type, the capacitor C2 is connected between the negative terminal of the DC bus and a three-phase AC neutral point potential, the capacitor C3 is connected between the positive terminal of the DC bus and the three-phase AC neutral point potential, and a high-frequency current may be fed back to a DC side when the power system operates, thus effectively reducing a high-frequency leakage current generated when the power system operates.

In one embodiment, as shown in FIG. 5, the power system switching between the charge-discharge function and the driving function further includes a filtering module 103, a filtering control module 104, an EMI-filter module 105 and a second pre-charging control module 106.

The filtering module 103 is connected between the bidirectional DC/AC module 50 and the charge-discharge control module 70. Specifically, the filtering module 103 includes inductors $L_A$, $L_B$, $L_C$ and capacitors C4, C5, C6, and the bidirectional DC/AC module 50 may comprise six IGBTs (insulated gate bipolar transistor), a connection point between an upper IGBT and a lower IGBT is connected with the filtering module 103 and the motor control switch 60 via a power bus respectively.

As shown in FIG. 5, the filtering control module 104 is connected between the second node B and the filtering module 103, and controlled by the controller module 80. When the current operation mode of the power system is the driving mode, the controller module 80 controls the filtering control module 104 to turn off. The filtering control module 104 may be a contactor relay, and consists of a contactor K10. The EMI-filter module 105 is connected between the charge-discharge socket 20 and the charge-discharge control module 70. It should be noted that, the position of the contactor K10 in FIG. 5 is merely exemplary. In other embodiments, the contactor K10 may be located at other positions, provided that the filtering module 103 may be turned off using the contactor K10. For example, in another embodiment, the contactor K10 may also be connected between the bidirectional DC/AC module 50 and the filtering module 103.

The second pre-charging control module 106 is connected with the charge-discharge control module 70 in parallel and configured to pre-charge capacitors C4, C5, C6 in the filtering module 103. The second pre-charging control module 106 includes three resistors $R_A$, $R_B$, $R_C$ and a three-phase pre-charging switch K9.

In one embodiment, as shown in FIG. 5, the charge-discharge control module 70 includes a three-phase switch K8 and/or a single-phase switch K7 configured to implement a three-phase charge-discharge or a single-phase charge-discharge.

In other words, in some embodiments, when the power system starts, the controller module 80 controls the first switch K1 to turn on to pre-charge the first capacitor C1 in the bidirectional DC/DC module 30 and the bus capacitor C0; and when the voltage across the bus capacitor C0 is a predetermined multiple of the voltage of the power battery 10, the controller module 80 controls the first switch K1 to turn off and controls the second switch K2 to turn on. In this way, the bidirectional DC/DC module 30 and the large-capacity bus capacitor C0 directly connected between power buses (i.e. DC buses) constitute main components for implementing a battery activation technology at a low temperature, and are configured to transfer the electric energy of the power battery 10 to the large-capacity bus capacitor C0 via the bidirectional DC/DC module 30, and to transfer the electric energy stored in the large-capacity bus capacitor C0 to the power battery 10 via the bidirectional DC/DC module 30 (i.e. charge the power battery 10). Therefore, the circulating charge and discharge of the power battery 10 makes the temperature of the power battery 10 rise to an optimum operation temperature range.

When the current operation mode of the power system is the driving mode, the controller module 80 controls the driving control switch 40 to turn on to stop the bidirectional DC/DC module 30, controls the motor control switch 60 to turn on to drive the motor M normally, and controls the charge-discharge control module 70 to turn off. In this way, a DC from the power battery 10 is inverted into an AC by means of the bidirectional DC/AC module 50, and the AC is transmitted to the motor M. The motor M can be controlled by a revolving transformer decoder technology and a space vector pulse width modulation (SVPWM) control algorithm.

When the current operation mode of the power system is the charge-discharge mode, the controller module 80 controls the driving control switch 40 to turn off to start the bidirectional DC/DC module 30, controls the motor control switch 60 to turn off to remove the motor M, and controls the charge-discharge control module 70 to turn on, such that an external power source such as a three-phase power source or a single-phase power source may charge the power battery 10 via the charge-discharge socket 20 normally. In other words, by detecting a charge connection signal, a type of an AC grid and relevant information on whole vehicle battery management, a controllable rectification function may be performed with aid of the bidirectional DC/AC module 50, and the power battery 10 may be charged by the single-phase power source and/or the three-phase power source with aid of the bidirectional DC/AC module 50 and the bidirectional DC/DC module 30.

With the power system switching between the charge-discharge function and the driving function according to embodiments of the present disclosure, the electric vehicle can be charged with a high power by means of a civil or industrial AC grid, such that a user may perform the charge efficiently, promptly, anytime and anywhere, thus saving a charging time. Moreover, a constant-voltage control device or a constant-current control device is not required, thus saving a space and a cost and having a wide battery operation voltage range.

Figure 6:
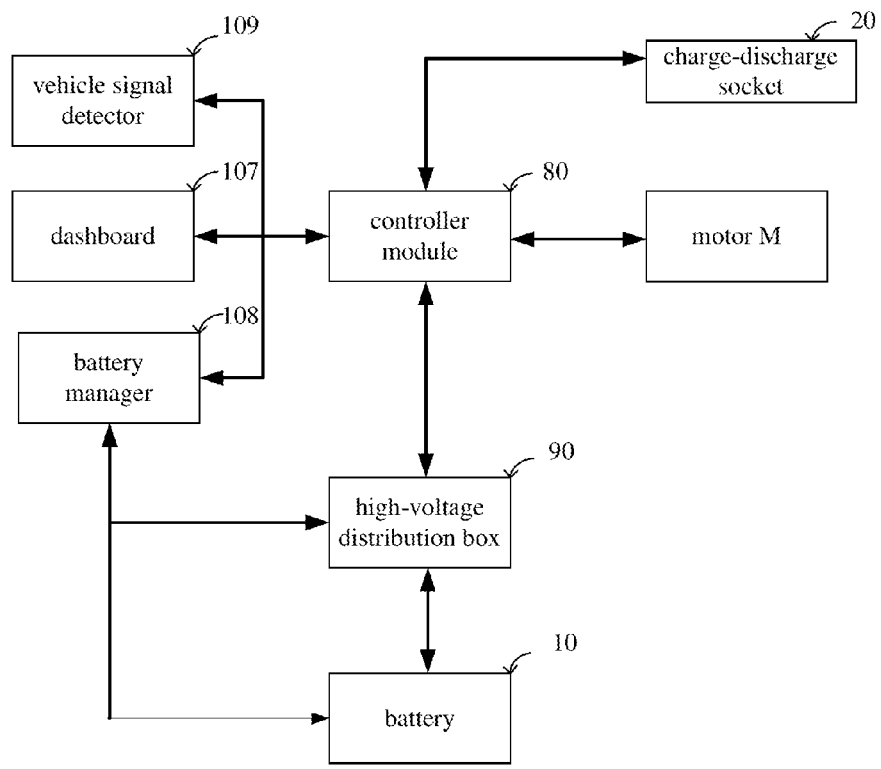
FIG. 6 is a block diagram of a power system switching between a charge-discharge function and a driving function according to an embodiment of the present disclosure.

In addition, in some embodiments, as shown in FIG. 6, the power system switching between the charge-discharge function and the driving function further includes a high-voltage distribution box 90, a dashboard 107, a battery manager 108 and a vehicle signal detector 109. The driving control module 40, the first switch K1 and the second switch K2 may be disposed in the high-voltage distribution box 90.

Figure 7:
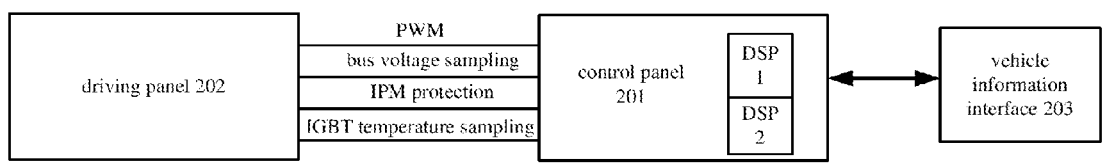
FIG. 7 is a block diagram of a controller module according to an embodiment of the present disclosure.

In one embodiment, as shown in FIG. 7, the controller module 80 includes a control panel 201 and a driving panel 202. A control module on the control panel 201 comprises two high-speed digital signal processing chips (i.e., DSP1 and DSP2). The control module on the control panel 201 is connected and communicated with a vehicle information interface 203. The control module on the control panel 201 is configured to receive a bus voltage sampling signal, an IPM protection signal and an IGBT temperature sampling signal output from a driving module on the driving panel 202, and to output a pulse width modulation (PWM) signal to the driving module.

Figure 8:
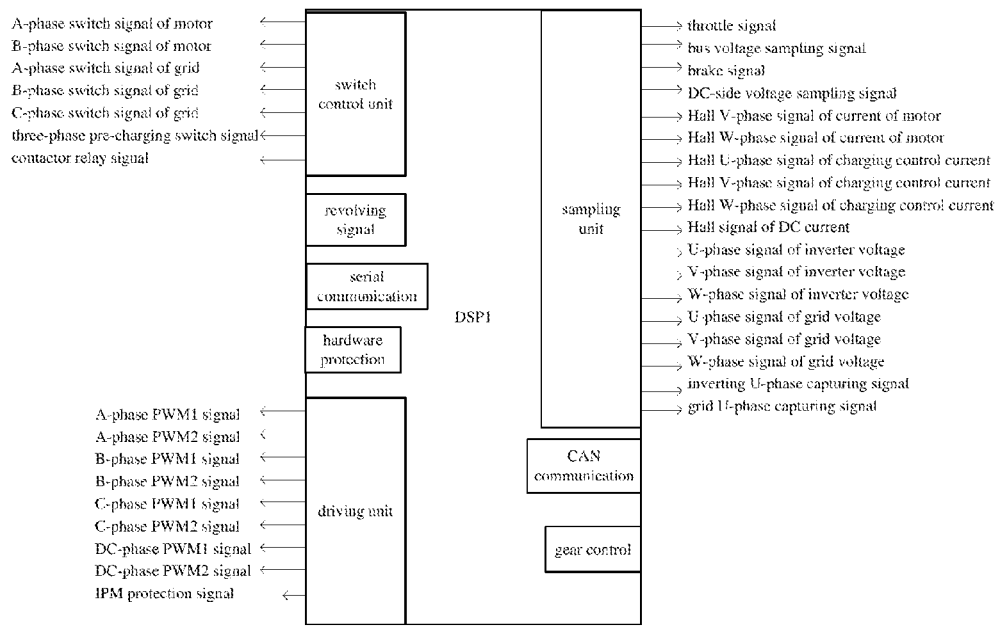
FIG. 8 is a diagram showing interfaces of DSP (digital signal processing) chips in a controller module to be connected with a peripheral hardware circuit.
Figure 8:
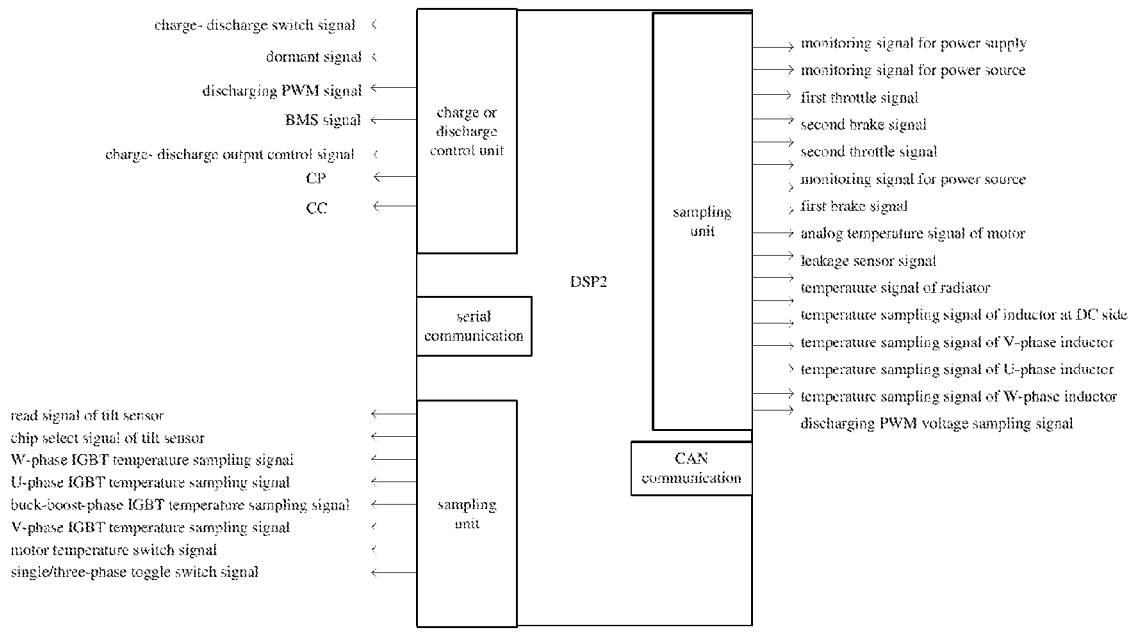

As shown in FIG. 8, the DSP1 is mainly configured to control and the DSP2 is configured to sample information. A sampling unit in the DSP1 outputs sampling signals comprising a throttle signal, a bus voltage sampling signal, a brake signal, a DC-side voltage sampling signal, a Hall V-phase signal of a current of the motor M, a Hall W-phase signal of the current of the motor M, a Hall U-phase signal of a charging control current, a Hall V-phase signal of the charging control current, a Hall W-phase signal of the charging control current, a Hall signal of a DC current, a U-phase signal of an inverter voltage, a V-phase signal of the inverter voltage, a W-phase signal of the inverter voltage, a U-phase signal of a grid voltage, a V-phase signal of the grid voltage, a W-phase signal of the grid voltage, an inverting U-phase capturing signal, a grid U-phase capturing signal, etc. A switch control unit in the DSP1 outputs an A-phase switch signal of the motor, a B-phase switch signal of the motor, an A-phase switch signal of the grid, a B-phase switch signal of the grid, a C-phase switch signal of the grid, a three-phase pre-charging switch signal, a contactor relay signal, etc. A driving unit in the DSP1 outputs an A-phase PWM1 signal, an A-phase PWM2 signal, a B-phase PWM1 signal, a B-phase PWM2 signal, a C-phase PWM1 signal, a C-phase PWM2 signal, a DC-phase PWM1 signal, a DC-phase PWM2 signal, an IPM protection signal, etc. In addition, the DSP1 also has other functions such as a revolving signal output control function, a serial communication function, a hardware protection function, a CAN communication function and a gear control function. A sampling unit in the DSP2 outputs a monitoring signal for a power supply, a monitoring signal for a power source, a first throttle signal, a second brake signal, a second throttle signal, a first brake signal, an analog temperature signal of the motor, a leakage sensor signal, a temperature signal of a radiator, a temperature sampling signal of an inductor at the DC side, a temperature sampling signal of a V-phase inductor, a temperature sampling signal of a U-phase inductor, a temperature sampling signal of a W-phase inductor, a discharging PWM voltage sampling signal, a read signal of a tilt sensor, a chip select signal of the tilt sensor, a W-phase IGBT temperature sampling signal, a U-phase IGBT temperature sampling signal, a buck-boost-phase IGBT temperature sampling signal, a V-phase IGBT temperature sampling signal, a motor temperature switch signal, a single/three-phase toggle switch signal, etc. A charge-discharge control unit in the DSP2 outputs a charge-discharge switch signal, a dormant signal, a discharging PWM signal, a BMS signal of a battery manager, a charge-discharge output control signal, a CP signal, a CC signal, etc. The DSP2 also has other functions such as a CAN communication function and a serial communication function.

Accordingly, the power system switching between the charge-discharge function and the driving function according to embodiments of the present disclosure combines a motor driving function, a vehicle control function, an AC charging function, a grid connection function, an off-grid on-load function and a vehicle-to-vehicle charging function. Moreover, the power system does not combine various functional modules simply and physically, but based on a motor driving control system, makes use of some peripheral devices to implement the diversification of the functions of the system, thus saving space and cost to a maximum extent and improving a power density.

Specifically, functions of the power system switching between the charge-discharge function and the driving function are simply described below.

1. Motor Driving Function

ADC from the power battery 10 is inverted into an AC by means of the bidirectional DC/AC module 50, and the AC is transmitted to the motor M. The motor M can be controlled by a revolving transformer decoder technology and a space vector pulse width modulation (SVPWM) control algorithm.

Figure 9:
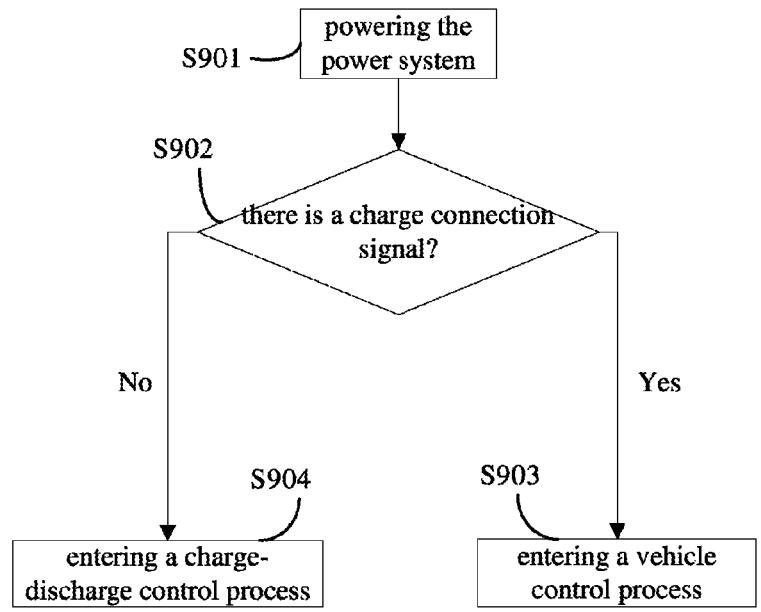
FIG. 9 is a flow chart of determining a function of a power system switching between a charge-discharge function and a driving function according to an embodiment of the present disclosure.

In other words, when the power system is powered to operate, as shown in FIG. 9, a process of determining a function of the power system includes the following steps.

At step 901, the power system is powered.

At step 902, it is determined whether there is a charge connection signal.

If there is a charge connection signal, step 903 is executed; otherwise, step 904 is executed.

At step 903, the power system enters a charge-discharge control process. In one embodiment, a throttle signal, a gear signal and a brake signal are also determined. When the throttle is zero, and the electric vehicle is in N gear, and the electric vehicle is braked by a handbrake, and the charge connection signal (i.e. a CC signal) is effective (i.e. the charge-discharge socket 20 is connected with a charge connection device), the power system enters the charge-discharge control process.

At step 904, the power system enters a vehicle control process.

After the power system enters the vehicle control process at step 904, the controller module 80 controls the motor control switch 60 to turn on, and informs the battery manager 108 via a CAN communication. The battery manager 108 controls the high-voltage distribution box 90 to pre-charge the first capacitor C1 and the bus capacitor C0, and then the controller module 80 detects a bus voltage 187 and determines whether the pre-charge is successful. If the pre-charge is successful, the controller module 80 informs the battery manager 108 to control the driving control switch 40 to turn on, such that the power system enters the driving mode; and the controller module 80 samples the vehicle information and drives the motor M via a comprehensive judgment process.

Figure 10:
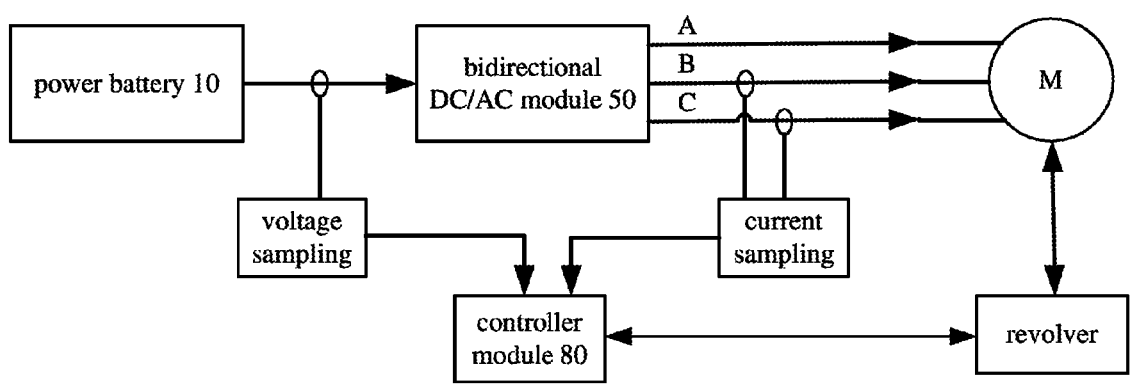
FIG. 10 is a block diagram of a power system switching between a charge-discharge function and a driving function according to an embodiment of the present disclosure performing a motor driving control function.

The motor driving control function is performed as follows. As shown in FIG. 10, the controller module 80 sends a PWM signal so as to control the bidirectional DC/AC module 50 to invert the DC from the power battery 10 into the AC and transmit the AC to the motor M. Subsequently, the controller module 80 solves a rotor location via a revolver and samples the bus voltage and B-phase and C-phase currents of the motor so as to make the motor M operate precisely. In other words, the controller module 80 adjusts the PWM signal according to the B-phase and C-phase current signals of the motor sampled by a current sensor and feedback information from the revolver, such that the motor M may operate precisely.

Thus, by sampling the throttle, brake and gear information of the whole vehicle by a communication module and determining a current operation state of the vehicle, an accelerating function, a decelerating function and an energy feedback function can be implemented, such that the whole vehicle can operates safely and reliably under any condition, thus ensuring the safety, dynamic performance and comfort of the vehicle.

Figure 11:
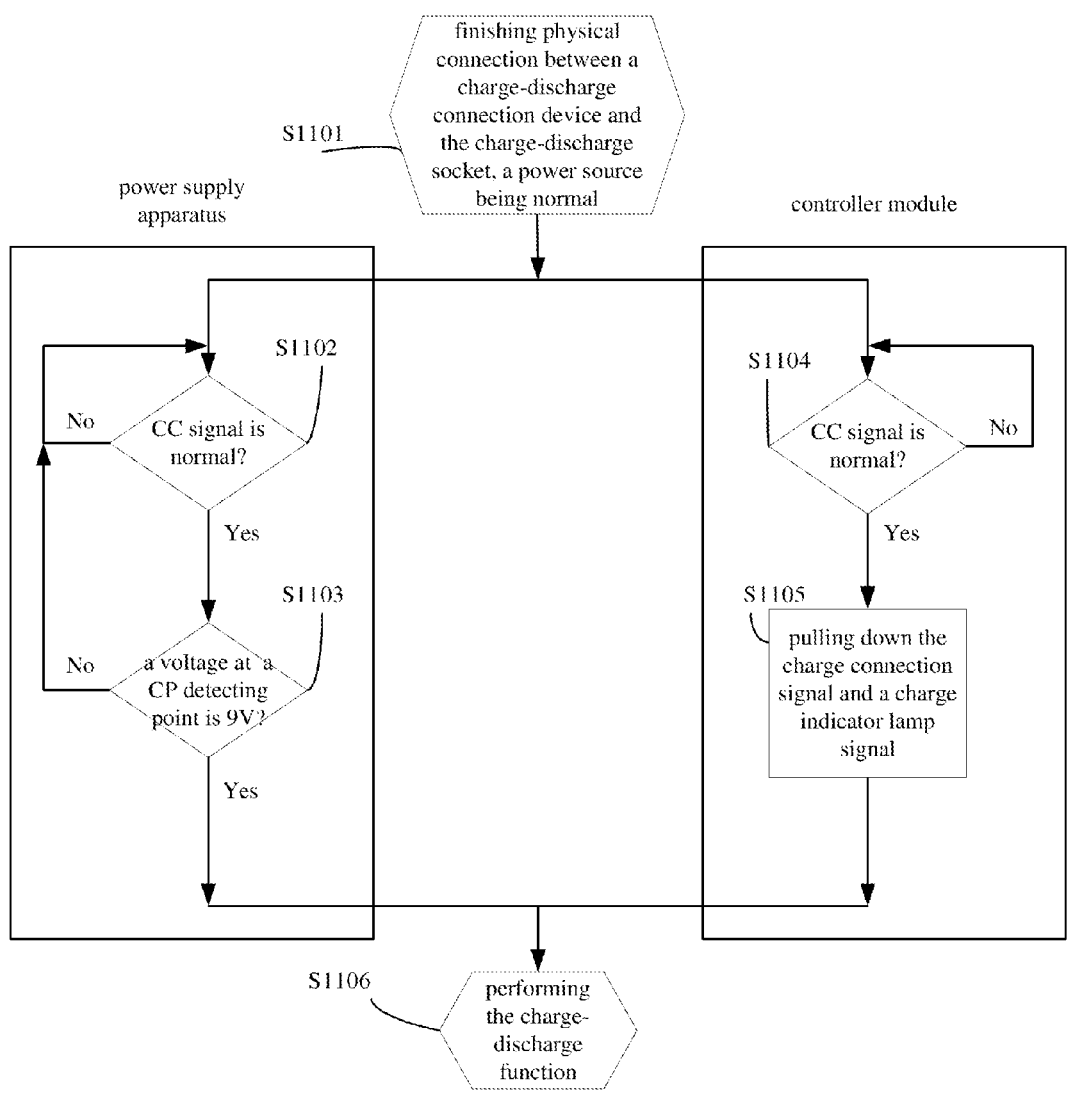
FIG. 11 is a flow chart of determining whether to start a charge-discharge function for a power system switching between a charge-discharge function and a driving function according to an embodiment of the present disclosure.

2. Charge-Discharge Function (1) Connection Confirmation and Start of Charge-Discharge Function As shown in FIG. 11, a process of determining whether to start the charge-discharge function of the power system includes the following steps.

At step 1101, the physical connection between the charge-discharge connection device and the charge-discharge socket is finished, and the power source is normal.

At step 1102, a power supply apparatus determines whether the charge connection signal (i.e. the CC signal) is normal, if yes, step 1103 is executed; if no, step 1102 is re-executed for another determining.

At step 1103, the power supply apparatus determines whether a voltage at a CP detecting point is 9V. If yes, step

1106 is executed; if no, step 1102 is re-executed for another determining. 9V is a predetermined value and is just exemplary.

At step 1104, the controller module determines whether the charge connection signal (i.e. the CC signal) is normal. If yes, step 1105 is executed; if no, step 1104 is re-executed for another determining.

At step 1105, the charge connection signal and a charge indicator lamp signal are pulled down.

At step 1106, the power system enters the charge-discharge function.

Figure 12:
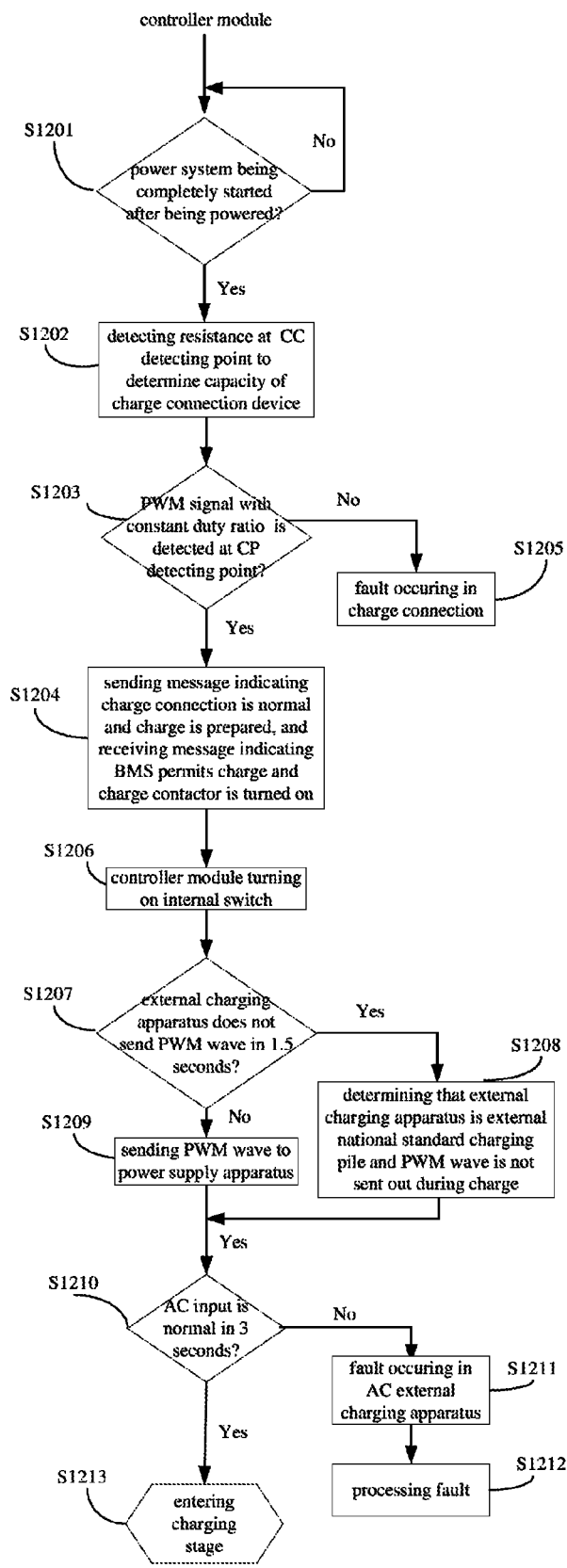
FIG. 12 is a flow chart of controlling a power system switching between a charge-discharge function and a driving function according to an embodiment of the present disclosure in a charging operation mode.

As shown in FIG. 12, a process of controlling the power system in a charging mode includes following steps.

At step 1201, it is determined whether the power system is completely started after being powered. If yes, step 1202 is executed; if no, step 1201 is re-executed for another determining.

At step 1202, a resistance at a CC (charge connection) detecting point is detected, so as to determine a capacity of the charge connection device.

At step 1203, it is determined whether a PWM signal with a constant duty ratio is detected at the CP detecting point. If yes, step 1204 is executed; if no, step 1205 is executed.

At step 1204, a message indicating the charge connection is normal and the charge is prepared is sent out and a message indicating BMS permits the charge and a charge contactor is turned on is received, and step 1206 is executed.

At step 1205, a fault occurs in the charge connection.

At step 1206, the controller module turns on an internal switch.

At step 1207, it is determined whether an external charging apparatus does not send a PWM wave in a predetermined time such as 1.5 seconds. If yes, step 1208 is executed; if no, step 1209 is executed.

At step 1208, it is determined that the external charging apparatus is an external national standard charging post and the PWM wave is not sent out during the charge.

At step 1209, the PWM wave is sent to the power supply apparatus.

At step 1210, it is determined whether an AC input is normal in a predetermined time such as 3 seconds. If yes, step 1213 is executed; if no, step 1211 is executed.

At step 1211, a fault occurs in an AC external charging apparatus.

At step 1212, the fault is processed.

At step 1213, the power system enters the charging stage.

In other words, as shown in FIGS. 11-12, after the power supply apparatus and the controller module 80 detect themselves and no fault occurs therein, the capacity of the charge connection device may be determined by detecting a resistance of the CC signal, and it is determined whether the charge-discharge connection device is connected totally by detecting the CP signal. After it is determined that the charge-discharge connection device is connected totally, the message indicating the charge connection is normal and the charge is prepared is sent out, and the battery manager 108 controls the high-voltage distribution box 90 to turn on the first switch K1 so as to pre-charge the first capacitor C1 and the bus capacitor C0. After the pre-charge, the first switch K1 is turned off and the second switch K2 is turned on. The controller module 80 receives the message indicating BMS permits the charge and the second switch K2 is turned on, and thus the charge-discharge is prepared, i.e., functions such as the AC charging function (G to V, grid to vehicle), the off-grid on-load function (V to L, vehicle to load), the grid connection function (V to G, vehicle to grid) and the vehicle-to-vehicle charging function (V to V, vehicle to vehicle), may be set via the dashboard.

(2) AC Charging Function (G to V)

When the power system receives a charging instruction from the dashboard, the controller module 80 determines a minimum charging current among a maximum charging current allowed by the battery manager 80, a maximum power supply current of the power supply apparatus and a rated current of the charge-discharge connection device (i.e. the charge-discharge socket 20), and selects relevant charging parameters automatically. Moreover, the power system samples the AC transmitted by the power supply apparatus via a grid voltage sampling module 183, so as to obtain a sampling value. The controller module 80 solves an effective value of an AC voltage according to the sampling value and determines an AC frequency by capturing. A type of the AC can be determined according to the effective value of the AC voltage and the AC frequency, and control parameters can be selected according to the type of the AC. After the control parameters are determined, the controller module 80 controls the three-phase pre-charging switch K9 in the second pre-charging module 106 and the contactor K10 in the filtering control module 104 to turn on, so as to charge the bus capacitor C0 at a DC side. The controller module 80 samples the bus voltage 187, i.e. the voltage across the bus capacitor C0. When the bus voltage reaches a predetermined control parameter, for example, the bus voltage is a predetermined multiple of the voltage of the power battery 10, the controller module 80 controls the three-phase switch K8 to turn on and the three-phase switch K9 to turn off. According to selected parameters, the controller module 80 sends the PWM signal to control the bidirectional DC/AC module 50 to rectify an AC to obtain a DC. Then, the controller module 80 controls the bidirectional DC/DC module 30 to adjust the voltage of the DC according to the voltage of the power battery 10, and finally the DC is transmitted to the power battery 10. During the above process, the controller module 80 performs a closed-loop current control on the power system according to the determined target charging current and phase currents fed back from a current sampling module 184, and finally the power battery 10 is charged. Thus, by detecting a charge connection signal, a type of an AC grid and relevant information on whole vehicle battery management, a controllable rectification function may be performed with aid of the bidirectional DC/AC module 50, and the power battery 10 may be charged by the single-phase power source and/or the three-phase power source with aid of the bidirectional DC/DC module 30 and the bidirectional DC/AC module 50.

(3) Off-Grid On-Load Function (V to L)

When the power system receives a V to L instruction from the dashboard, it is first determined whether a state of charge (SOC) of the power battery 10 is in an allowable discharging range. If yes, a type of an output voltage is selected according to the V to L instruction. A maximum output power is selected intelligently and controls parameters are given according to the rated current of the charge-discharge connection device, and then the power system enters a control process. First, the controller module 80 controls the three-phase switch K8 and the contactor K10 to turn on and sends the PWM signal to control the bidirectional DC/DC module 30 to adjust the voltage of the DC according to the voltage of the power battery and a given output voltage. After the voltage adjusted by the bidirectional DC/DC module 30 reaches a target value, the DC is transmitted to the bidirectional DC/AC module 50 to be inverted into the AC, and electric apparatuses may be powered by the AC directly via a dedicated charge socket. During the above process, the controller module 80 performs the adjustment according to a feedback of the voltage sampling module 183, so as to ensure safe and reliable operation of a load.

In other words, after the power system is powered, when the V to L instruction from the dashboard and a required type of an output voltage are received, the charge connection signal and relevant information on whole vehicle battery management are detected, the DC/DC voltage conversion is performed according to the voltage of the power battery, and the DC is inverted into the AC by means of the bidirectional DC/AC module 50, thus outputting a stable single-phase/three-phase AC voltage.

(4) Grid Connection Function (V to G)

When the power system receives a V to G instruction from the dashboard, it is first determined whether the state of charge (SOC) of the power battery 10 is in the allowable discharging range. If yes, a type of an output voltage is selected according to the V to G instruction. A maximum output power is selected intelligently and controls parameters are given according to the rated current of the charge-discharge connection device, and the power system enters a control process. First, the controller module 80 controls the three-phase switch K8 and the contactor K10 to turn on and sends the PWM signal to control the bidirectional DC/DC module 30 to adjust the voltage of the DC according to the voltage of the power battery and the given output voltage. Then, the DC is transmitted to the bidirectional DC/AC module 50 to be inverted into the AC. During the above process, the controller module 80 performs the closed-loop current control on the power system according to a predetermined target discharging current and the phase currents fed back from the current sampling 184, so as to implement the grid connection discharging.

In other words, after the power system is powered, when the V to G instruction from the dashboard is received, the charge connection signal, the type of the AC grid and relevant information on whole vehicle battery management are detected, the DC/DC voltage conversion is performed according to the voltage of the power battery, and the DC is inverted into the AC by means of the bidirectional DC/AC module 50, and thus the vehicle supplies the single-phase/three-phase AC to the grid.

(5) Vehicle-to-Vehicle Charging Function (V to V)

The V to V function requires a dedicated connection plug. When the power system determines that the charge connection signal (i.e. CC signal) is effective and the connection plug is a dedicated charge plug for the V to V function by detecting a level of the connection plug, the power system is prepared for an instruction from the dashboard. For example, assuming vehicle A charges vehicle B, the vehicle A is set in a discharging state, i.e. the vehicle A is set to perform the off-grid on-load function, and the vehicle B is set in an AC charging state. The controller module in vehicle A sends the message indicating the charge connection is normal and the charge is prepared to the battery manager. The battery manager controls a charge-discharge circuit to perform the pre-charging, and sends the message indicating the charge is permitted and the charging contactor is turned on to the controller module after the pre-charging is finished. Then, the power system performs the discharging function and sends the PWM signal. After the vehicle B receives the charging instruction, the power system therein detects a CP signal which determines that the vehicle A is prepared to supply power, and the controller module 80 sends a normal connection message to the battery manager. After receiving the message, the battery manager 108 finishes the pre-charging process and informs the controller module that the whole power system is prepared for the charge. Then, the vehicle-to-vehicle charging function (V to V) starts, and thus vehicles can charge each other.

In other words, after the power system is powered, when the V to V instruction from the dashboard is received, the charge connection signal and relevant information on whole vehicle battery management are detected, and the vehicle is set in an AC power output state and sends the CP signal by simulating an external charging apparatus, so as to communicate with the vehicle to be charged. With the vehicle, the DC/DC voltage conversion is performed according to the voltage of the power battery, and the DC is inverted into the AC by means of the bidirectional DC/AC module 50, and thus the vehicle can charge another vehicle with the single-phase/three-phase AC.

Figure 13:
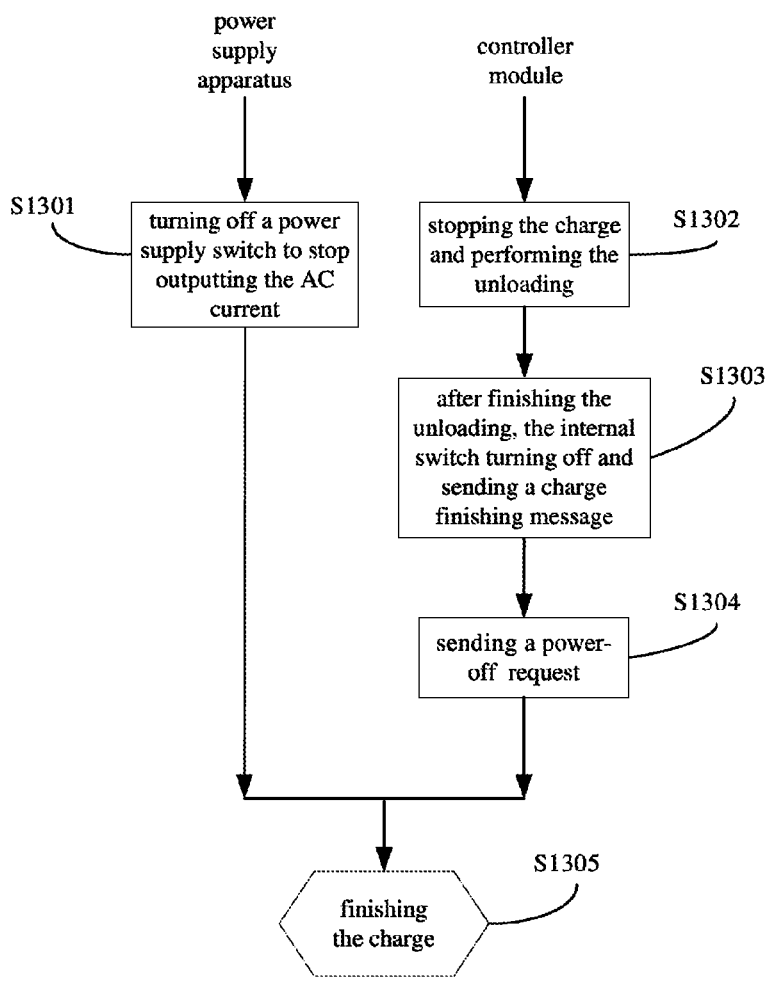
FIG. 13 is a flow chart of controlling a power system switching between a charge-discharge function and a driving function according to an embodiment of the present disclosure when the charging of the electric vehicle is finished.

In one embodiment, as shown in FIG. 13, a process of controlling the power system when the charging of the electric vehicle is finished includes the following steps.

At step 1301, the power supply apparatus turns off a power supply switch to stop outputting the AC, and step 1305 is executed.

At step 1302, the controller module stops the charge and performs the unloading, and step 1303 is executed.

At step 1303, after the unloading is finished, the internal switch is turned off and a charge finishing message is sent out.

At step 1304, a power-off request is sent out.

At step 1305, the charge is finished.

Figure 14:
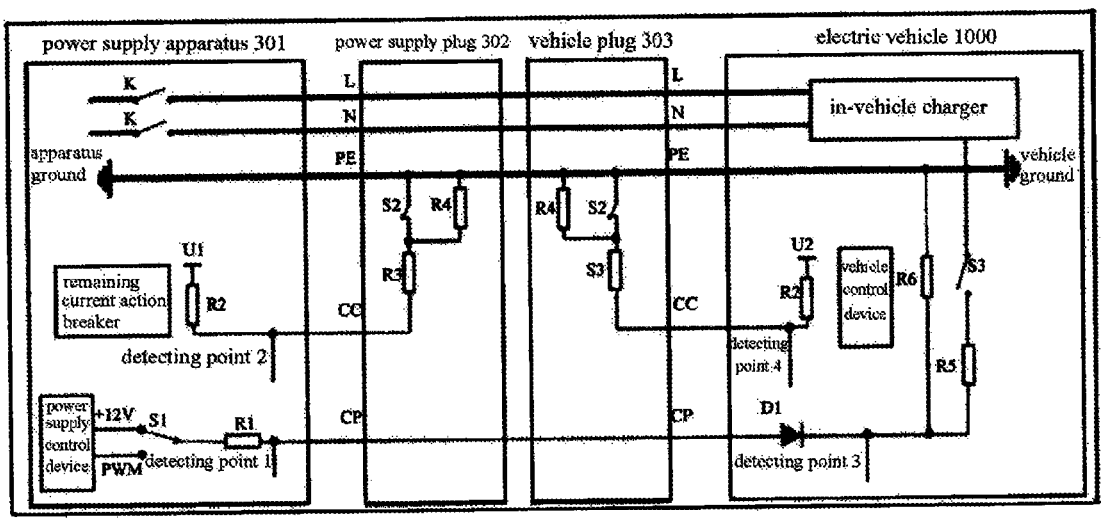
FIG. 14 is a circuit diagram of a connection between an electric vehicle and a power supply apparatus according to an embodiment of the present disclosure.

As shown in FIG. 14, a power supply apparatus 301 is connected with a vehicle plug 303 of an electric vehicle 1000 via a power supply plug 302, so as to charge the electric vehicle 1000. The power system of the electric vehicle 1000 detects a CP signal at a detecting point 3 and detects a CC signal at a detecting point 4, and the power supply apparatus 301 detects the CP signal at a detecting point 1 and detects the CC signal at a detecting point 2. After the charge is finished, the internal switches S2 in both the power supply plug 302 and the vehicle plug 303 are controlled to turn off.

In another embodiment, a plurality of power systems connected in parallel can be used in the electric vehicle to charge the power battery. For example, two power systems connected in parallel are used to charge the power battery, and the two power systems use a common controller module.

Figure 15:
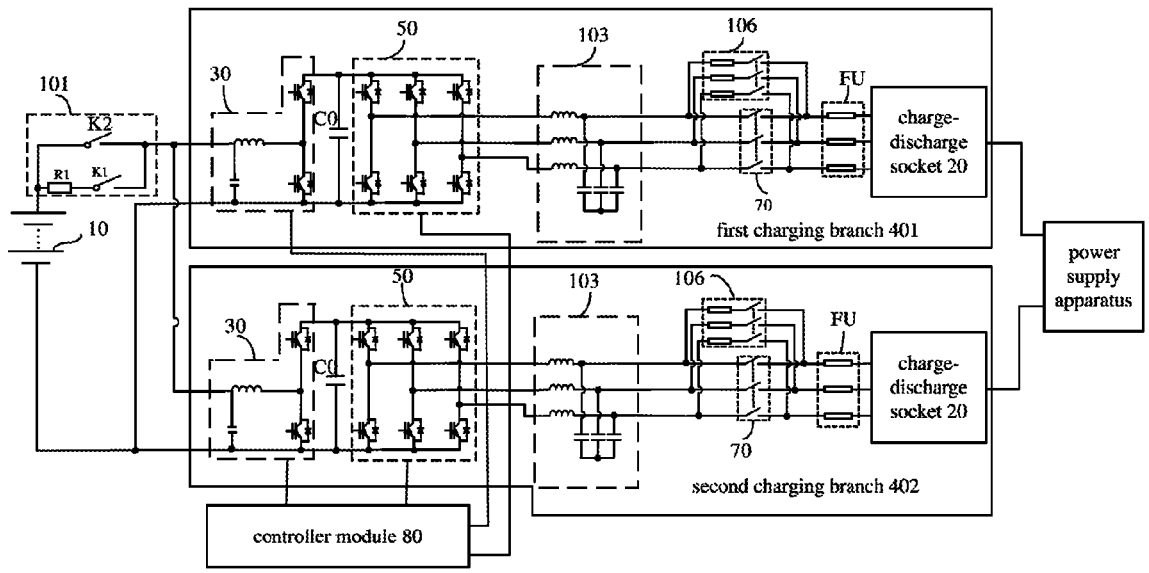
FIG. 15 is a schematic diagram of charging an electric vehicle using two power systems connected in parallel according to an embodiment of the present disclosure.

In this embodiment, as shown in FIG. 15, a charging system for the electric vehicle includes a power battery 10, a first charging branch 401, a second charging branch 402 and a controller module 80. Each of the first charging branch 401 and the second charging branch 402 includes a charge-discharge socket 20, a bidirectional DC/DC module 30, a bus capacitor C0, a bidirectional DC/AC module 50, a filtering module 103, a charge-discharge control module 70 and a second pre-charging module 106. Moreover, each of the first charging branch 401 and the second charging branch 402 further includes a fuse FU. The power battery 10 is connected with the first charging branch 401 via the first pre-charging control module 101, and connected with the second charging branch 402 via the first pre-charging control module 101. The controller module 80 is connected with the first charging branch 401 and the second charging branch 402 respectively, and configured to control the grid to charge the power battery 10 via the first charging branch 401 and the second charging branch 402 respectively when receiving a charging signal.

In addition, an embodiment of the present disclosure provides a method for controlling charging an electric vehicle. The method includes following steps.

At step 1, when determining that a first charging branch is connected with a power supply apparatus via a charge-discharge socket and a second charging branch is connected with the power supply apparatus via the charge-discharge socket, a controller module sends a charge connection signal to a battery manager.

At step 2, after receiving the charge connection signal sent from the controller module, the battery manager detects and determines whether a power battery needs to be charged, if yes, a next step is executed.

At step 3, the battery manager sends a charging signal to the controller module.

At step 4, after receiving the charging signal, the controller module controls the grid to charge the power battery via the first charging branch and the second charging branch respectively.

With the charging system for the electric vehicle and the method for controlling charging the electric vehicle according to the above embodiments of the present disclosure, the controller module controls the grid to charge the power battery via the first charging branch and the second charging branch respectively, such that a charging power of the electric vehicle is increased and a charging time is shortened greatly, thus implementing a fast charge and saving a time cost.

In some embodiments, the power system switching between the charge-discharge function and the driving function has a wide compatibility and performs a single-phase/three-phase switching function, and thus is adapted to various power grids of different countries.

Figure 16:
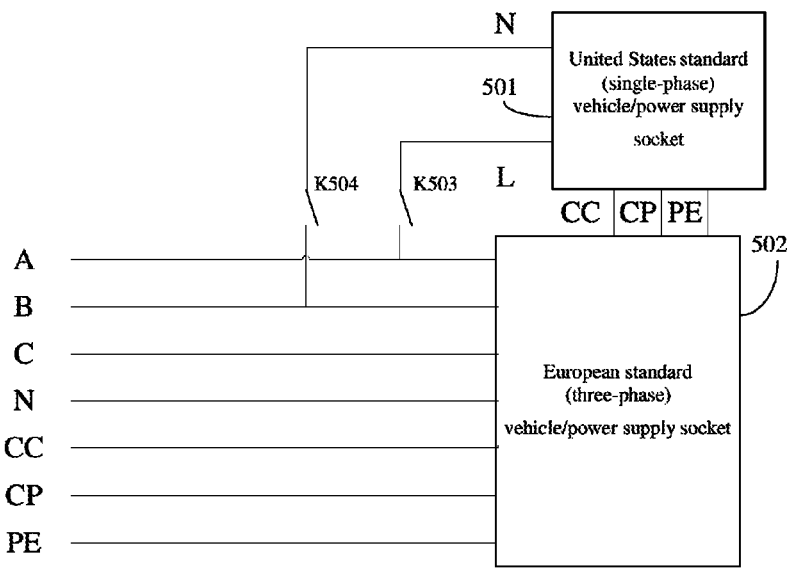
FIG. 16 is a schematic diagram of a charge-discharge socket according to an embodiment of the present disclosure.

Specifically, as shown in FIG. 16, the charge-discharge socket 20 has a function of switching between two charging sockets (such as a United States standard charging socket and a European standard charging socket). The charge-discharge socket 20 includes a single-phase charging socket 501 such as the United States standard charging socket, a three-phase charging socket 502 such as the European standard charging socket and two high-voltage contactors K503 and K504. A CC terminal, a CP terminal and a PE terminal are common terminals for the single-phase charging socket 501 and the three-phase charging socket 502. The single-phase charging socket 501 has an L-phase wire and an N-phase wire connected with an A-phase wire and a B-phase wire of the three-phase charging socket 502 via the contactors K503 and K504 respectively. When receiving a single-phase charge-discharge instruction, the controller module 80 controls the contactors K503 and K504 to turn on, such that the A-phase and B-phase wires of the three-phase charging socket 502 are connected with the L-phase and N-phase wires of the single-phase charging socket 501 respectively. The three-phase charging socket 502 does not operate, and instead of the L-phase and N-phase wires of the single-phase charging socket 501, the A-phase and B-phase wires of the three-phase charging socket 502 are connected with the charge plug, and thus the controller module 80 can perform the single-phase charging function normally.

Alternatively, as shown in FIG. 5, a standard 7-core socket is used and the single-phase switch K7 is added between the N-phase and B-phase wires. When receiving the single-phase charge-discharge instruction, the controller module 80 controls the single-phase switch K7 to turn on so as to connect the B-phase wire with the N-phase wire. Then, the A-phase and B-phase wires are used as the L-phase and N-phase wires respectively, and the connection plug should be a dedicated connection plug or a connection plug whose B-phase and C-phase wires are not used.

In other words, in some embodiments, the power system detects a voltage of the grid via the controller module 80 and determines the frequency and the single-phase/three-phase of the grid by calculation, so as to obtain the type of the grid. Then, the controller module 80 selects different control parameters according to a type of the charge-discharge socket 20 and the type of the grid. Furthermore, the controller module 80 controls the bidirectional DC/AC module 50 to rectify the AC controllably to obtain the DC and controls the bidirectional DC/DC module 30 to adjust the voltage of the DC according to the voltage of the power battery. Finally, the DC is transmitted to the power battery 10.

Figure 17:
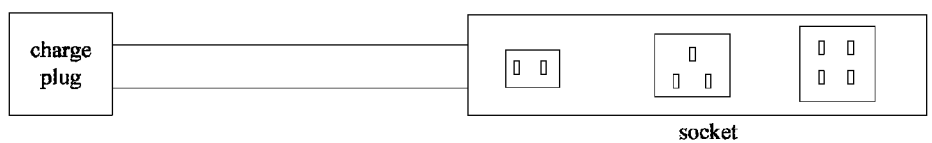
FIG. 17 is a schematic diagram of an off-grid on-load discharge plug according to an embodiment of the present disclosure.

In another embodiment, as shown in FIG. 17, an off-grid on-load discharging socket includes two-core, three-core and four-core sockets connected with a charge plug, and is configured to output single-phase, three-phase and four-phase current.

Figure 18:
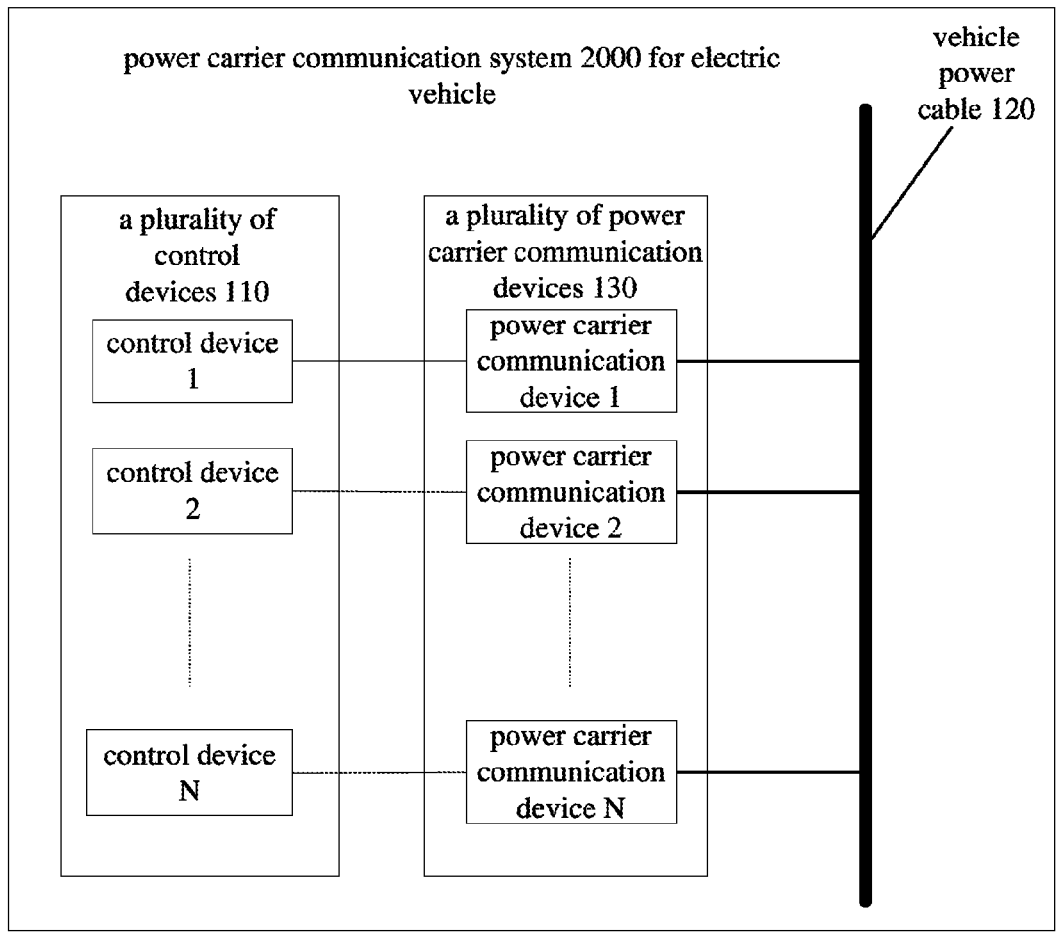
FIG. 18 is a block diagram of a power carrier communication system for an electric vehicle according to an embodiment of the present disclosure.

FIG. 18 is a block diagram of a power carrier communication system for an electric vehicle according to an embodiment of the present disclosure.

As shown in FIG. 18, the power carrier communication system 2000 includes a plurality of control devices 110, a vehicle power cable 120 and a plurality of power carrier communication devices 130.

Specifically, each of the control devices 110 has a communication interface, in which the communication interface may be, for example, but is not limited to, a serial communication interface SCI. The vehicle power cable 120 supplies power to the control devices 110, and the control devices 110 communicate with each other via the vehicle power cable 120. The power carrier communication devices 130 correspond to the control devices 110 respectively, and the control devices 110 are connected with corresponding power carrier communication devices 130 via their own communication interfaces respectively, and the power carrier communication devices 130 are connected with each other via the vehicle power cable 120. The power carrier communication devices 130 obtain a carrier signal from the vehicle power cable 120 so as to demodulate the carrier signal and send the demodulated carrier signal to the corresponding control device 110, and also receive and demodulate information sent from the corresponding control device 110 and send the demodulated information to the vehicle power cable 120.

With reference to FIG. 18, the plurality of control devices 110 include a control device 1 to a control device N (N is larger than or equal to 2 and is an integer). The plurality of power carrier communication devices 130 corresponding to the plurality of control devices 110 comprise a power carrier communication device 1 to a power carrier communication device N. For example, when the control device 1 needs to be communicated with the control device 2, the control device 2 first sends a carrier signal to the power carrier communication device 2, and the power carrier communication device 2 demodulates the carrier signal and sends the demodulated carrier signal to the vehicle power cable 120. Then, the power carrier communication device 1 obtains and demodulates the carrier signal from the vehicle power cable 120, and sends the demodulated carrier signal to the control device 1.

Figure 19:
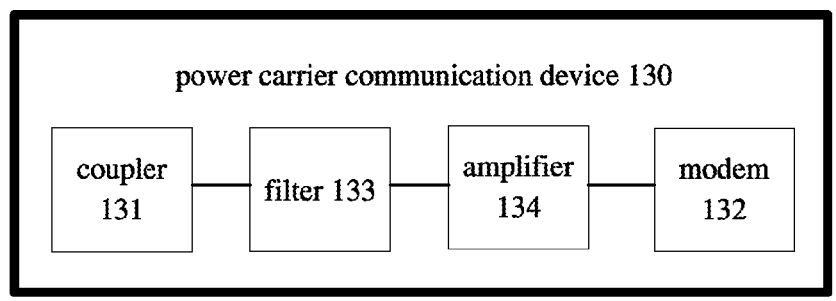
FIG. 19 is a block diagram of a power carrier communication device.

As shown in FIG. 19, each of the power carrier communication devices 130 includes a coupler 131, a filter 133, an amplifier 134 and a modem 132 connected sequentially.

Figure 20:
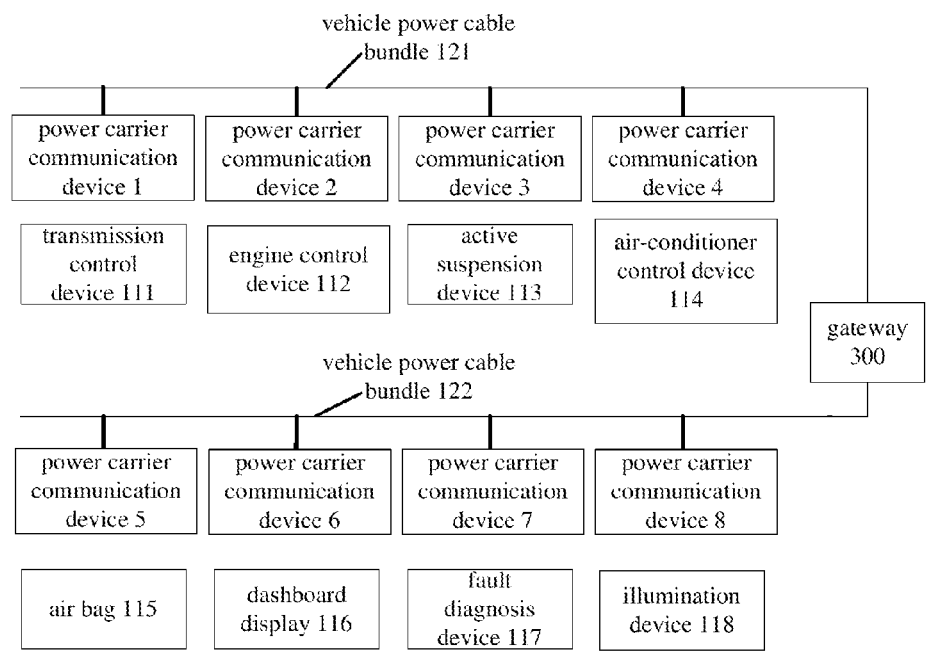
FIG. 20 is a schematic diagram of communications between eight power carrier communication devices and corresponding control devices.

Further, as shown in FIG. 20, the plurality of power carrier communication devices 130, such as eight power carrier communication devices 1-8, are connected with a gateway 300 via a vehicle power cable bundle 121 and a vehicle power cable bundle 122, and each power carrier communication device corresponds to one control device. For example, the power carrier communication device 1 corresponds to a transmission control device 111, the power carrier communication device 2 corresponds to an engine control device 112, the power carrier communication device 3 corresponds to an active suspension device 113, the power carrier communication device 4 corresponds to an air-conditioner control device 114, the power carrier communication device 5 corresponds to an air bag 115, the power carrier communication device 6 corresponds to a dashboard display 116, the power carrier communication device 7 corresponds to a fault diagnosis device 117, and the power carrier communication device 8 corresponds to an illumination device 118.

Figure 21:
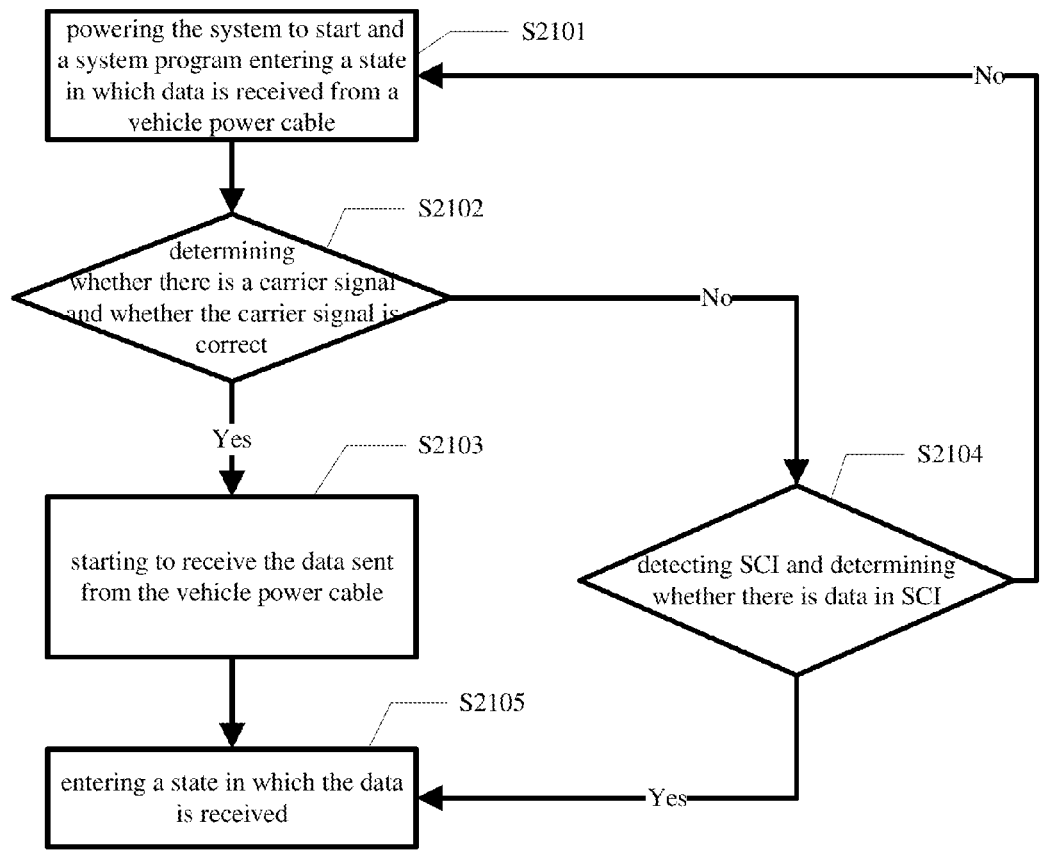
FIG. 21 is a flow chart of a method for receiving data by a power carrier communication system.

In this embodiment, as shown in FIG. 21, a method for receiving data by a power carrier communication system includes following steps.

At step 2101, the system is powered to start and a system program enters a state in which data is received from a vehicle power cable.

At step 2102, it is determined whether there is a carrier signal and whether the carrier signal is correct, if yes, step 2103 is executed; if no, step 2104 is executed.

At step 2103, the system starts to receive the data sent from the vehicle power cable, and step 2105 is executed.

At step 2104, the serial communication interface (SCI) is detected and it is determined whether there is data in the serial communication interface (SCI), if yes, step 2105 is executed; if no, step 2101 is returned.

At step 2105, the system enters a state in which the data is received.

With the power carrier communication system for the electric vehicle according to embodiments of the present disclosure, a data transmission and sharing among various control systems in the electric vehicle can be achieved without increasing internal cable bundles of the vehicle. Moreover, a power carrier communication using the power cable as a communication medium avoids constructing and investing a new communication network, thus reducing the manufacturing cost and maintenance difficulty.

Figure 22:
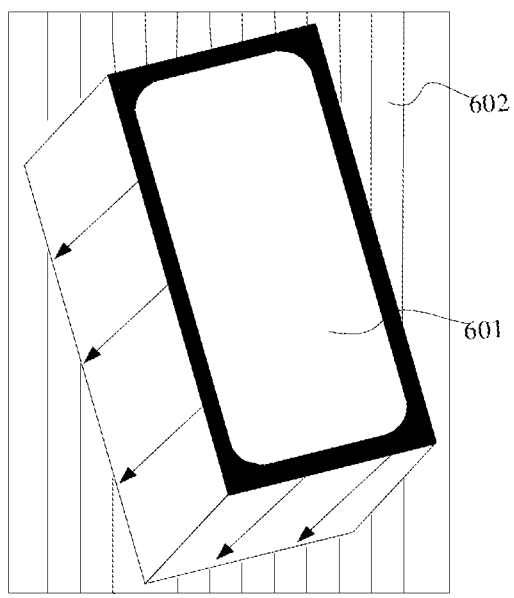
FIG. 22 is a schematic view of a body of a power system switching between a charge-discharge function and a driving function according to an embodiment of the present disclosure.

In one embodiment, the above power system switching between the charge-discharge function and the driving function is cooled in a water-cooling mode. As shown in FIG. 22, a body of the power system uses an inductor heat dissipation water channel and an IGBT heat dissipation water channel at the same time, thus solving the heat dissipation and space occupation problem. The body of the power system is divided into an upper layer, and a lower layer and a back surface of the IGBT heat dissipation water channel is configured to cool the filtering module. The body is manufactured according to a shape of an inductor and shaped into an inductor trough 601. Sides of the inductor trough 601 are configured to conduct heat to a water channel 602, and finally the water channel 602 takes away the heat. In addition, the inductor is fixed by a glue having a high heat conductivity, thus improving a heat conduction capability and a mechanical strength of the entire structure. The power system according to embodiments of the present disclosure is cooled in the water-cooling mode which has a better heat dissipation effect than an air-cooling mode. A volume of the filtering module can be reduced under a same power, and thus a volume and a weight of the entire power system can also be reduced.

In addition, embodiments of another aspect of the present disclosure provide an electric vehicle, comprising the above-mentioned power system. The electric vehicle can be charged with a high power by means of a three-phase or single-phase current, such that a user may charge the electric vehicle conveniently, promptly, anytime and anywhere, thus saving a time cost and satisfying the requirement of persons.

Any procedure or method described in the flow charts or described in any other way herein may be understood to include one or more modules, portions or parts for storing executable codes that realize particular logic functions or procedures. Moreover, advantageous embodiments of the present disclosure includes other implementations in which the order of execution is different from that which is depicted or discussed, including executing functions in a substantially simultaneous manner or in an opposite order according to the related functions. This should be understood by those skilled in the art to which embodiments of the present disclosure belong.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A power system switching between a charge-discharge function and a driving function, comprising:
   a power battery;
   a charge-discharge socket;
   a bidirectional DC/DC module having a first DC terminal connected with a first terminal of the power battery and a second DC terminal connected with a second terminal of the power battery, wherein the first DC terminal is a common DC terminal for an input to and an output from the bidirectional DC/DC module;
   a driving control switch having a first terminal connected with the second terminal of the power battery and a second terminal connected with a third DC terminal of the bidirectional DC/DC module;
   a bidirectional DC/AC module having a first DC terminal connected with the second terminal of the driving control switch and a second DC terminal connected with the first terminal of the power battery;
   a motor control switch having a first terminal connected with an AC terminal of the bidirectional DC/AC module and a second terminal connected with a motor;
   a charge-discharge control module having a first terminal connected with the AC terminal of the bidirectional DC/AC module and a second terminal connected with the charge-discharge socket; and
   a controller module connected with the driving control switch, the motor control switch and the charge-discharge control module respectively, and configured to establish a path between the power battery and the motor when a current operation mode of the power system is a driving mode, and to establish a path between the charge-discharge socket and the power battery when the current operation mode of the power system is a charge-discharge mode.

2. The power system according to claim 1, wherein when the current operation mode of the power system is the driving mode, the controller module controls the driving control switch to turn on to stop the bidirectional DC/DC module, controls the motor control switch to turn on, and controls the charge-discharge control module to turn off.

3. The power system according to claim 1, wherein when the current operation mode of the power system is the charge-discharge mode, the controller module controls the driving control switch to turn off to start the bidirectional DC/DC module, controls the motor control switch to turn off, and controls the charge-discharge control module to turn on to start the bidirectional DC/AC module.

4. The power system according to claim 1, further comprising:
   a first pre-charging control module having a first terminal connected with the second terminal of the power battery and a second terminal connected with the second DC terminal of the bidirectional DC/DC module, and configured to pre-charge a first capacitor in the bidirectional DC/DC module and a bus capacitor connected between the first DC terminal and the third DC terminal of the bidirectional DC/DC module.

5. The power system according to claim 4, wherein the first pre-charging control module comprises:
   a first switch having a first terminal connected with the second DC terminal of the bidirectional DC/DC module;
   a first resistor having a first terminal connected with a second terminal of the first switch and a second terminal connected with the second terminal of the power battery; and
   a second switch, connected in parallel with the first resistor and the first switch which are connected in series, wherein when the power system starts, the controller module controls the first switch to turn on to pre-charge the first capacitor in the bidirectional DC/DC module and the bus capacitor; and when a voltage across the bus capacitor is a predetermined multiple of a voltage of the power battery, the controller module controls the first switch to turn off and controls the second switch to turn on.

6. The power system according to claim 1, wherein the bidirectional DC/DC module comprises:
   a first switching transistor and a second switching transistor connected in series, and connected between the first DC terminal and the third DC terminal of the bidirectional DC/DC module, and controlled by the controller module, in which a first node is defined between the first switching transistor and the second switching transistor;
   a first diode connected with the first switching transistor in inverse-parallel;
   a second diode connected with the second switching transistor in inverse-parallel;
   a first inductor having a first terminal connected with the first node and a second terminal connected with the second terminal of the power battery; and
   a first capacitor having a first terminal connected with the second terminal of the first inductor and a second terminal connected with the first terminal of the power battery.

7. The power system according to claim 1, further comprising:
   a leakage current reducing module connected between the first DC terminal and the third DC terminal of the bidirectional DC/DC module.

8. The power system according to claim 7, wherein the leakage current reducing module comprises:
   a second capacitor and a third capacitor, in which the second capacitor has a first terminal connected with a first terminal of the third capacitor and a second terminal connected with the third DC terminal of the bidirectional DC/DC module, the third capacitor has a second terminal connected with the first DC terminal of the bidirectional DC/DC module, and a second node is defined between the second capacitor and the third capacitor.

9. The power system according to claim 8, further comprising:
a filtering module connected between the bidirectional DC/AC module and the charge-discharge control module.

10. The power system according to claim 9, further comprising:
a filtering control module connected between the second node and the filtering module, in which when the current operation mode of the power system is the driving mode, the controller module controls the filtering control module to turn off.

11. The power system according to claim 9, further comprising:
an EMI-filter module connected between the charge-discharge socket and the charge-discharge control module.

12. The power system according to claim 11, further comprising:
a second pre-charging control module connected with the charge-discharge control module in parallel and configured to pre-charge a capacitor in the filtering module.

13. The power system according to claim 1, wherein the charge-discharge control module comprises:
a three-phase switch and/or a single-phase switch configured to implement a three-phase charge-discharge or a single-phase charge-discharge.

14. An electric vehicle comprising a power system, the power system comprising:
a power battery;
a charge-discharge socket;
a bidirectional DC/DC module having a first DC terminal connected with a first terminal of the power battery and a second DC terminal connected with a second terminal of the power battery, wherein the first DC terminal is a common DC terminal for an input to and an output from the bidirectional DC/DC module;
a driving control switch having a first terminal connected with the second terminal of the power battery and a second terminal connected with a third DC terminal of the bidirectional DC/DC module;
a bidirectional DC/AC module having a first DC terminal connected with the second terminal of the driving control switch and a second DC terminal connected with the first terminal of the power battery;
a motor control switch having a first terminal connected with an AC terminal of the bidirectional DC/AC module and a second terminal connected with a motor;
a charge-discharge control module having a first terminal connected with the AC terminal of the bidirectional DC/AC module and a second terminal connected with the charge-discharge socket; and
a controller module connected with the driving control switch, the motor control switch and the charge-discharge control module respectively, and configured to establish a path between the power battery and the motor when a current operation mode of the power system is a driving mode, and to establish a path between the charge-discharge socket and the power battery when the current operation mode of the power system is a charge-discharge mode.

15. The power system according to claim 14, wherein when the current operation mode of the power system is the driving mode, the controller module controls the driving control switch to turn on to stop the bidirectional DC/DC module, controls the motor control switch to turn on, and controls the charge-discharge control module to turn off.

16. The electric vehicle according to claim 14, wherein when the current operation mode of the power system is the charge-discharge mode, the controller module controls the driving control switch to turn off to start the bidirectional DC/DC module, controls the motor control switch to turn off, and controls the charge-discharge control module to turn on to start the bidirectional DC/AC module.

17. The electric vehicle according to claim 14, wherein the power system further comprises:
a first pre-charging control module having a first terminal connected with the second terminal of the power battery and a second terminal connected with the second DC terminal of the bidirectional DC/DC module, and configured to pre-charge a first capacitor in the bidirectional DC/DC module and a bus capacitor connected between the first DC terminal and the third DC terminal of the bidirectional DC/DC module.

18. The power system according to claim 17, wherein the first pre-charging control module comprises:
a first switch having a first terminal connected with the second DC terminal of the bidirectional DC/DC module;
a first resistor having a first terminal connected with a second terminal of the first switch and a second terminal connected with the second terminal of the power battery; and
a second switch, connected in parallel with the first resistor and the first switch which are connected in series,
wherein when the power system starts, the controller module controls the first switch to turn on to pre-charge the first capacitor in the bidirectional DC/DC module and the bus capacitor;
and when a voltage across the bus capacitor is a predetermined multiple of a voltage of the power battery, the controller module controls the first switch to turn off and controls the second switch to turn on.

19. The power system according to claim 14, wherein the bidirectional DC/DC module comprises:
a first switching transistor and a second switching transistor connected in series, and connected between the first DC terminal and the third DC terminal of the bidirectional DC/DC module, and controlled by the controller module, in which a first node is defined between the first switching transistor and the second switching transistor;
a first diode connected with the first switching transistor in inverse-parallel;
a second diode connected with the second switching transistor in inverse-parallel;
a first inductor having a first terminal connected with the first node and a second terminal connected with the second terminal of the power battery; and
a first capacitor having a first terminal connected with the second terminal of the first inductor and a second terminal connected with the first terminal of the power battery.

20. The power system according to claim 14, wherein the power system further comprises:
a leakage current reducing module connected between the first DC terminal and the third DC terminal of the bidirectional DC/DC module.

* * * * *